US012598286B2

(12) United States Patent
Xiong et al.

(10) Patent No.: US 12,598,286 B2
(45) Date of Patent: Apr. 7, 2026

(54) DEPTH-VARYING REPROJECTION PASSTHROUGH IN VIDEO SEE-THROUGH (VST) EXTENDED REALITY (XR)

(71) Applicant: Samsung Electronics Co., Ltd., Suwon-si (KR)

(72) Inventors: Yingen Xiong, Mountain View, CA (US); Christopher A. Peri, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 200 days.

(21) Appl. No.: 18/526,726

(22) Filed: Dec. 1, 2023

(65) Prior Publication Data

US 2024/0223742 A1 Jul. 4, 2024

Related U.S. Application Data

(60) Provisional application No. 63/525,916, filed on Jul. 10, 2023, provisional application No. 63/436,282, filed on Dec. 30, 2022.

(51) Int. Cl.
H04N 13/344 (2018.01)
G06T 19/00 (2011.01)
(Continued)

(52) U.S. Cl.
CPC ......... H04N 13/344 (2018.05); G06T 19/006 (2013.01); H04N 13/128 (2018.05); H04N 13/239 (2018.05)

(58) Field of Classification Search
CPC .. H04N 13/344; H04N 13/128; H04N 13/239; G06T 19/006; G06T 17/00
See application file for complete search history.

(56) References Cited

U.S. PATENT DOCUMENTS 9,800,864 B2 10/2017 Aronsson et al.
10,948,726 B2 3/2021 Zhu et al.
(Continued)

FOREIGN PATENT DOCUMENTS

WO 2018213131 A1 11/2018
WO 2022212109 A1 10/2022

OTHER PUBLICATIONS

Supplementary European Search Report dated Oct. 13, 2025 in connection with European Patent Application No. 23912935.6, 9 pages.

(Continued)

*Primary Examiner* — Chong Wu

(57) ABSTRACT

A method includes obtaining images of a scene captured using a stereo pair of imaging sensors of an XR device and depth data associated with the images, where the scene includes multiple objects. The method also includes obtaining volume-based 3D models of the objects. The method further includes, for one or more first objects, performing depth-based reprojection of the one or more 3D models of the one or more first objects to left and right virtual views based on one or more depths of the one or more first objects. The method also includes, for one or more second objects, performing constant-depth reprojection of the one or more 3D models of the one or more second objects to the left and right virtual views based on a specified depth. In addition, the method includes rendering the left and right virtual views for presentation by the XR device.

20 Claims, 13 Drawing Sheets

(51) Int. Cl.
  *H04N 13/128* (2018.01)
  *H04N 13/239* (2018.01)

(56) References Cited

U.S. PATENT DOCUMENTS

| | | | | |
|---|---|---|---|---|
| 11,200,745 | B2 | 12/2021 | Johnson et al. | |
| 11,310,487 | B1 | 4/2022 | Clemens et al. | |
| 11,386,529 | B2 | 7/2022 | Taylor | |
| 2013/0176405 | A1 | 7/2013 | Jeong et al. | |
| 2014/0198189 | A1 | 7/2014 | Aronsson et al. | |
| 2015/0325040 | A1 | 11/2015 | Stirbu | |
| 2018/0033209 | A1* | 2/2018 | Akeley | G06T 19/006 |
| 2019/0101758 | A1* | 4/2019 | Zhu | G06T 3/00 |
| 2021/0174472 | A1 | 6/2021 | Taylor | |
| 2021/0174570 | A1 | 6/2021 | Bleyer et al. | |
| 2021/0233305 | A1 | 7/2021 | Garcia et al. | |
| 2021/0233314 | A1 | 7/2021 | Johnson et al. | |
| 2021/0400249 | A1 | 12/2021 | Edmonds et al. | |
| 2022/0327784 | A1 | 10/2022 | Strandborg et al. | |

OTHER PUBLICATIONS

Muhlhausen et al., "Temporal Consistent Motion Parallax for Omni-directional Stereo Panorama Video," VRST 20, Nov. 2020, 9 pages.

* cited by examiner

DEPTH-VARYING REPROJECTION PASSTHROUGH IN VIDEO SEE-THROUGH (VST) EXTENDED REALITY (XR)

CROSS-REFERENCE TO RELATED APPLICATIONS AND PRIORITY CLAIM

This application claims priority under 35 U.S.C. § 119(e) to U.S. Provisional Patent Application No. 63/436,282 filed on Dec. 30, 2022 and U.S. Provisional Patent Application No. 63/525,916 filed on Jul. 10, 2023. Both of these provisional patent applications are hereby incorporated by reference in their entirety.

TECHNICAL FIELD

This disclosure relates generally to extended reality (XR) systems and processes. More specifically, this disclosure relates to depth-varying reprojection passthrough in video see-through (VST) XR.

BACKGROUND

Extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

SUMMARY

This disclosure relates to depth-varying reprojection passthrough in video see-through (VST) extended reality (XR).

In a first embodiment, a method includes obtaining (i) images of a scene captured using a stereo pair of imaging sensors of an XR device and (ii) depth data associated with the images, where the scene includes multiple objects. The method also includes obtaining volume-based three-dimensional (3D) models of the objects included in the scene. The method further includes, for one or more first objects of the multiple objects, performing depth-based reprojection of the one or more 3D models of the one or more first objects to a left virtual view and a right virtual view based on one or more depths of the one or more first objects. The method also includes, for one or more second objects of the multiple objects, performing constant-depth reprojection of the one or more 3D models of the one or more second objects to the left virtual view and the right virtual view based on a specified depth. In addition, the method includes rendering the left virtual view and the right virtual view for presentation by the XR device.

In a second embodiment, an XR device includes at least one display. The XR device also includes imaging sensors configured to capture images of a scene, where the scene includes multiple objects. The XR device further includes at least one processing device configured to obtain (i) the images of the scene and (ii) depth data associated with the images and to obtain volume-based 3D models of the objects included in the scene. The at least one processing device is also configured, for one or more first objects of the multiple objects, to perform depth-based reprojection of the one or more 3D models of the one or more first objects to a left virtual view and a right virtual view based on one or more depths of the one or more first objects. The at least one processing device is further configured, for one or more second objects of the multiple objects, to perform constant-depth reprojection of the one or more 3D models of the one or more second objects to the left virtual view and the right virtual view based on a specified depth. In addition, the at least one processing device is configured to render the left virtual view and the right virtual view for presentation by the at least one display.

In a third embodiment, a non-transitory machine readable medium contains instructions that when executed cause at least one processor to obtain (i) images of a scene captured using a stereo pair of imaging sensors of an XR device and (ii) depth data associated with the images, where the scene includes multiple objects. The non-transitory machine readable medium also contains instructions that when executed cause the at least one processor to obtain volume-based 3D models of the objects included in the scene. The non-transitory machine readable medium further contains instructions that when executed cause the at least one processor, for one or more first objects of the multiple objects, to perform depth-based reprojection of the one or more 3D models of the one or more first objects to a left virtual view and a right virtual view based on one or more depths of the one or more first objects. The non-transitory machine readable medium also contains instructions that when executed cause the at least one processor, for one or more second objects of the multiple objects, to perform constant-depth reprojection of the one or more 3D models of the one or more second objects to the left virtual view and the right virtual view based on a specified depth. In addition, the non-transitory machine readable medium contains instructions that when executed cause the at least one processor to render the left virtual view and the right virtual view for presentation by the XR device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IOT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include any other electronic devices now known or later developed.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which.

DETAILED DESCRIPTION

Figure 1:
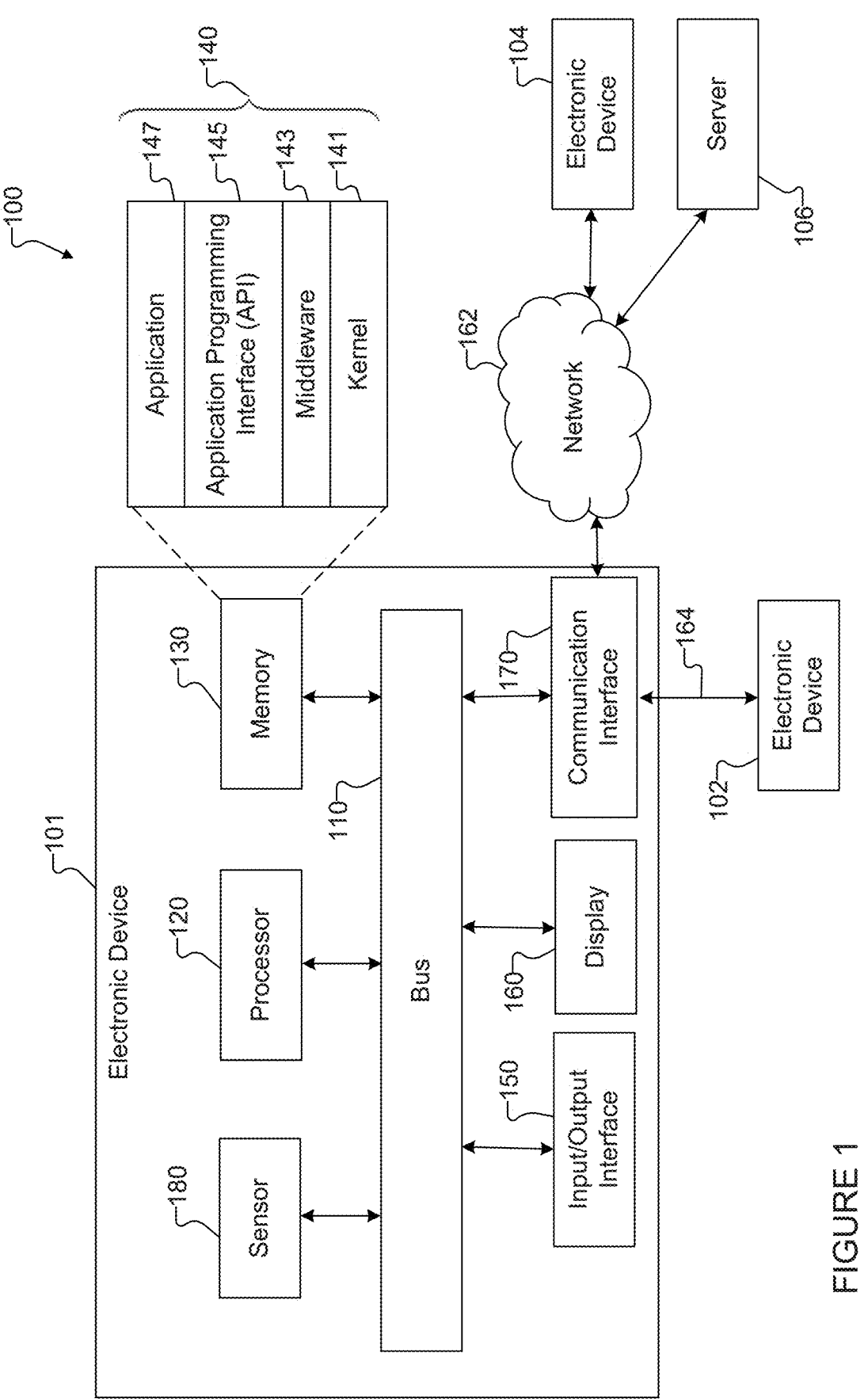
FIG. 1 illustrates an example network configuration including an electronic device in accordance with this disclosure.

FIGS. 1 through 13, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, extended reality (XR) systems are becoming more and more popular over time, and numerous applications have been and are being developed for XR systems. Some XR systems (such as augmented reality or "AR" systems and mixed reality or "MR" systems) can enhance a user's view of his or her current environment by overlaying digital content (such as information or virtual objects) over the user's view of the current environment. For example, some XR systems can often seamlessly blend virtual objects generated by computer graphics with real-world scenes.

Optical see-through (OST) XR systems refer to XR systems in which users directly view real-world scenes through head-mounted devices (HMDs). Unfortunately, OST XR systems face many challenges that can limit their adoption. Some of these challenges include limited fields of view, limited usage spaces (such as indoor-only usage), failure to display fully-opaque black objects, and usage of complicated optical pipelines that may require projectors, waveguides, and other optical elements. In contrast to OST XR systems, video see-through (VST) XR systems (also called "passthrough" XR systems) present users with generated video sequences of real-world scenes. VST XR systems can be built using virtual reality (VR) technologies and can have various advantages over OST XR systems. For example, VST XR systems can provide wider fields of view and can provide improved contextual augmented reality.

Viewpoint matching is often a useful or important operation in VST XR pipelines. Viewpoint matching typically refers to a process for creating video frames that are presented at a user's eye viewpoint locations using video frames captured at see-through camera viewpoint locations, which allows the user to feel as if the see-through cameras are positioned at the user's eye viewpoint locations. Among other things, viewpoint matching can involve depth-based reprojection in which objects within a scene are reprojected into virtual views based on the objects' depths within the scene. However, depth-based reprojection may require large amounts of computational resources (such as processing and memory resources) in order to reconstruct depths and perform depth reprojection, which can become particularly problematic at higher video resolutions (such as 4K resolutions and above). Moreover, depth-based reprojection may create latencies in VST XR pipelines, which can cause noticeable delays or other issues for users.

This disclosure provides depth-varying reprojection passthrough in VST XR. As described in more detail below, images of a scene captured using a stereo pair of imaging sensors of an XR device and depth data associated with the images are obtained, where the scene includes multiple objects. Volume-based three-dimensional (3D) models of the objects included in the scene are also obtained. For example, the XR device may determine whether, for each object within the scene, there is a corresponding volume-based 3D model for the object in a library of previously-generated volume-based 3D models. If so, the corresponding volume-based 3D model from the library may be used for an object. If not, a new volume-based 3D model may be generated for the object, and the new volume-based 3D model may be stored in the library for future use.

For one or more first objects of the multiple objects, depth-based reprojection of the one or more 3D models of the one or more first objects to a left virtual view and a right virtual view based on one or more depths of the one or more first objects may be performed. For one or more second objects of the multiple objects, constant-depth reprojection of the one or more 3D models of the one or more second objects to the left virtual view and the right virtual view based on a specified depth may be performed. In some cases, the constant-depth reprojection may be performed using a shader of a graphics processor unit (GPU), in which case the computational load of the constant-depth reprojection can be extremely small. The left virtual view and the right virtual view can be rendered for presentation by the XR device. The first and second objects can be identified in various ways, such as by using a trained machine learning model that segments a scene or by identifying a focus region where a user appears to be gazing. In some cases, the one or more first objects can include one or more foreground objects in the scene, and the one or more second objects can include one or more background objects in the scene.

In this way, these techniques provide efficient mechanisms for depth-varying reprojection, which can be used to support functions such as viewpoint matching and head pose change compensation. The described techniques can identify accurate depths for the one or more first objects, and a constant depth can be used for the one or more second objects. This allows the one or more first objects to be geometrically reconstructed with the accurate depths, while the one or more second objects can be projected onto a plane having the constant depth. As a result, final virtual views can be generated by accurate depth-based reprojection for some objects and constant-depth reprojection for other objects. These techniques can help to significantly reduce computational resources and computation times during depth reconstruction since accurate depths may only be needed for some objects, while the depth of other objects can be set to a constant value. Moreover, the depth reprojections performed here may create little if any hole artifacts since only the one or more first objects may undergo depth-based reprojection and all 3D information for the one or more first objects may be available due to the use of the 3D model(s). This can further simplify the depth reprojection process since hole artifact removal may not be needed or may be needed to a much lesser extent. Overall, these techniques can help to significantly improve the performance of a VST XR pipeline.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, and a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcon-trollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described below, the processor 120 may perform one or more functions related to depth-varying reprojection passthrough in VST XR.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications that, among other things, perform depth-varying reprojection passthrough in VST XR. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, the sensor(s) 180 include cameras or other imaging sensors, which may be used to capture images of scenes. The sensor(s) 180 can also include one or more buttons for touch input, one or more microphones, a depth sensor, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a biophysical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. Moreover, the sensor(s) 180 can include one or more position sensors, such as an inertial measurement unit that can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an XR wearable device, such as a headset or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may perform one or more functions related to depth-varying reprojection passthrough in VST XR.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
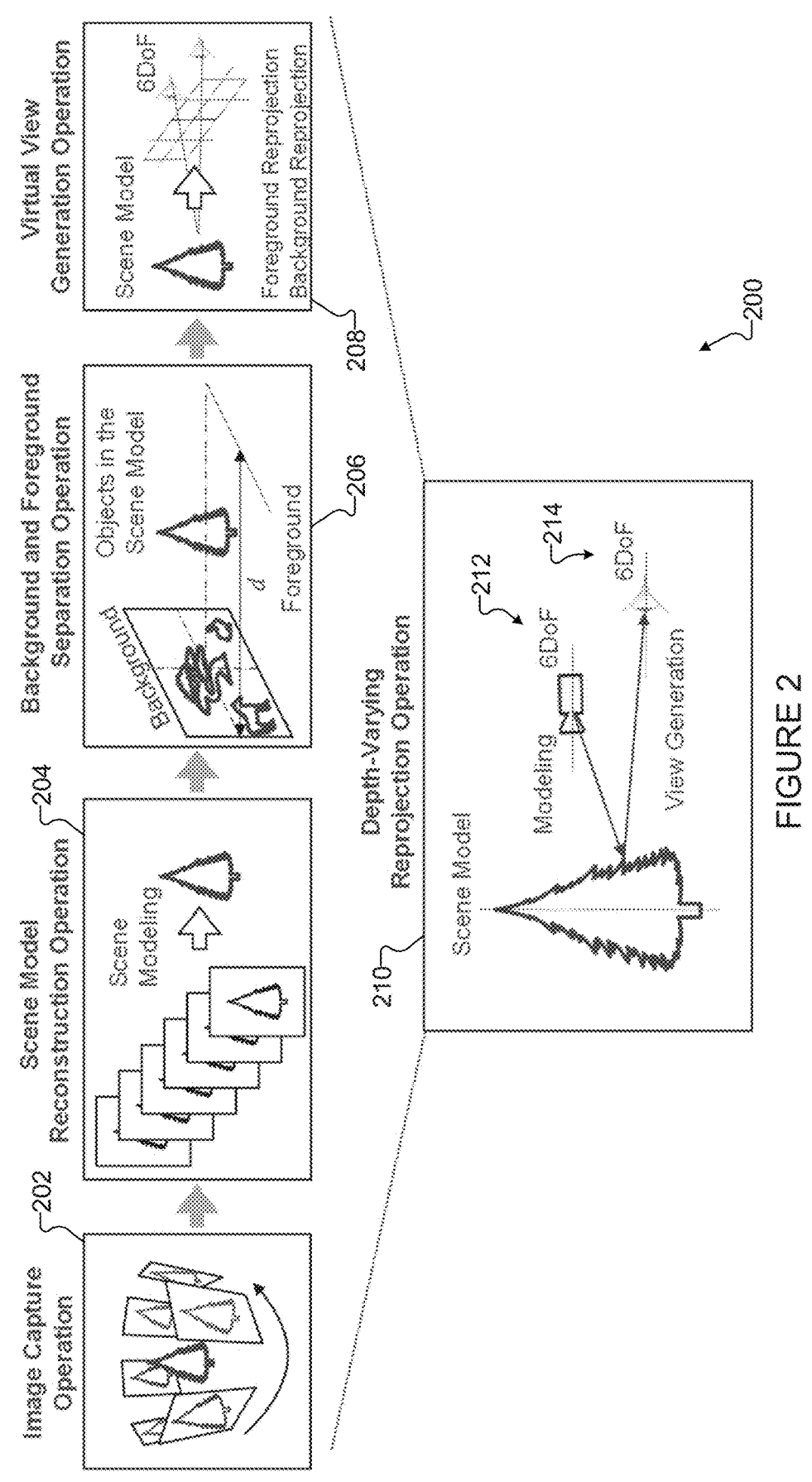
FIG. 2 illustrates an example process for depth-varying reprojection passthrough in video see-through (VST) extended reality (XR) in accordance with this disclosure.

FIG. 2 illustrates an example process 200 for depth-varying reprojection passthrough in VST XR in accordance with this disclosure. For ease of explanation, the process 200 of FIG. 2 is described as being performed by or implemented using the electronic device 101 in the network configuration 100 of FIG. 1. However, the process 200 may be implemented using any other suitable device(s) and in any other suitable system(s).

As shown in FIG. 2, the process 200 includes an image capture operation 202 in which images of a scene are captured or otherwise obtained. For example, images of the scene may be captured using a stereo pair of imaging sensors of an XR device, such as when the images are captured using a stereo pair of imaging sensors 180 of the electronic device 101. As described below, depth information associated with the scene can also be obtained. The depth information may be obtained in any suitable manner, such as by using at least one depth sensor 180 of the electronic device 101. Using the captured images and the depth information, a scene model reconstruction operation 204 can be performed to identify a 3D model of the overall scene as captured in the images and 3D models of individual objects detected within the scene as captured in the images. As described below, one or more of the 3D models may optionally be retrieved from a library of 3D models.

A background and foreground separation operation 206 can be performed to separate the reconstructed 3D scene into a foreground and a background. In some embodiments, separating the reconstructed 3D scene into a foreground and a background can be accomplished using the depth information associated with the detected objects within the scene. For instance, objects within a threshold distance from the XR device may be treated as foreground objects, while objects beyond the threshold distance from the XR device may be treated as background objects. In particular embodiments, the threshold distance may be determined automatically using a trained machine learning model. In other embodiments, separating the reconstructed 3D scene into a foreground and a background can be accomplished by tracking where it appears a user is gazing within a scene and treating that area as a focus region of the user. Objects within the focus region may be treated as foreground objects, while objects outside the focus region may be treated as background objects. Note that any other suitable technique may be used here to separate a reconstructed 3D scene into a foreground and a background.

Based on the object and scene 3D models and the segmentation of the scene into a foreground and a background, a virtual view generation operation 208 can be performed to generate virtual views of the scene for presentation to the user of the XR device. Here, the virtual view generation operation 208 can generate novel views of the scene based on, among other things, head poses of the user. The virtual view generation operation 208 can generate left and right views for presentation by the XR device, such as via presentation on one or more displays 160 of the electronic device 101. As part of the virtual view generation operation 208, depth-based reprojection (which can be more accurate) can be performed for the identified foreground objects based on the actual depth(s) of those foreground objects within the scene. Simpler constant-depth reprojection (which can be less accurate) can be performed for the identified background objects based on a specified constant depth within the scene.

Overall, the operations 202-208 of the process 200 can be used to collectively implement a depth-varying reprojection operation 210. The depth-varying reprojection operation 210 here is used to convert video frames captured at multiple see-through imaging sensor viewpoint locations 212 (each of which may have up to six degrees of freedom in terms of possible positions and orientations) into video frames that appear to have been captured at multiple eye viewpoint locations 214 of a user (each of which again may have up to six degrees of freedom in terms of possible positions and orientations). Ideally, from the perspective of the user, images presented to the user appear to have been captured by imaging sensors 180 at the locations of the user's eyes, while in reality the images are captured using imaging sensors 180 at other locations. The reprojection operation 210 is referred to as "depth-varying" here since the reprojection operation

210 can include both (i) depth-based reprojection of objects and (ii) constant-depth reprojection of other objects. A "depth-based" reprojection refers to a reprojection in which the 3D model of an object is projected based on the actual depth(s) of that object within a scene. A "constant-based" reprojection refers to a reprojection in which the 3D model of an object is projected to a specified constant depth regardless of the actual depth(s) of that object within a scene.

Although FIG. 2 illustrates one example of a process 200 for depth-varying reprojection passthrough in VST XR, various changes may be made to FIG. 2. For example, various functions in FIG. 2 may be combined, further subdivided, replicated, omitted, or rearranged and additional functions may be added according to particular needs.

Figure 3:
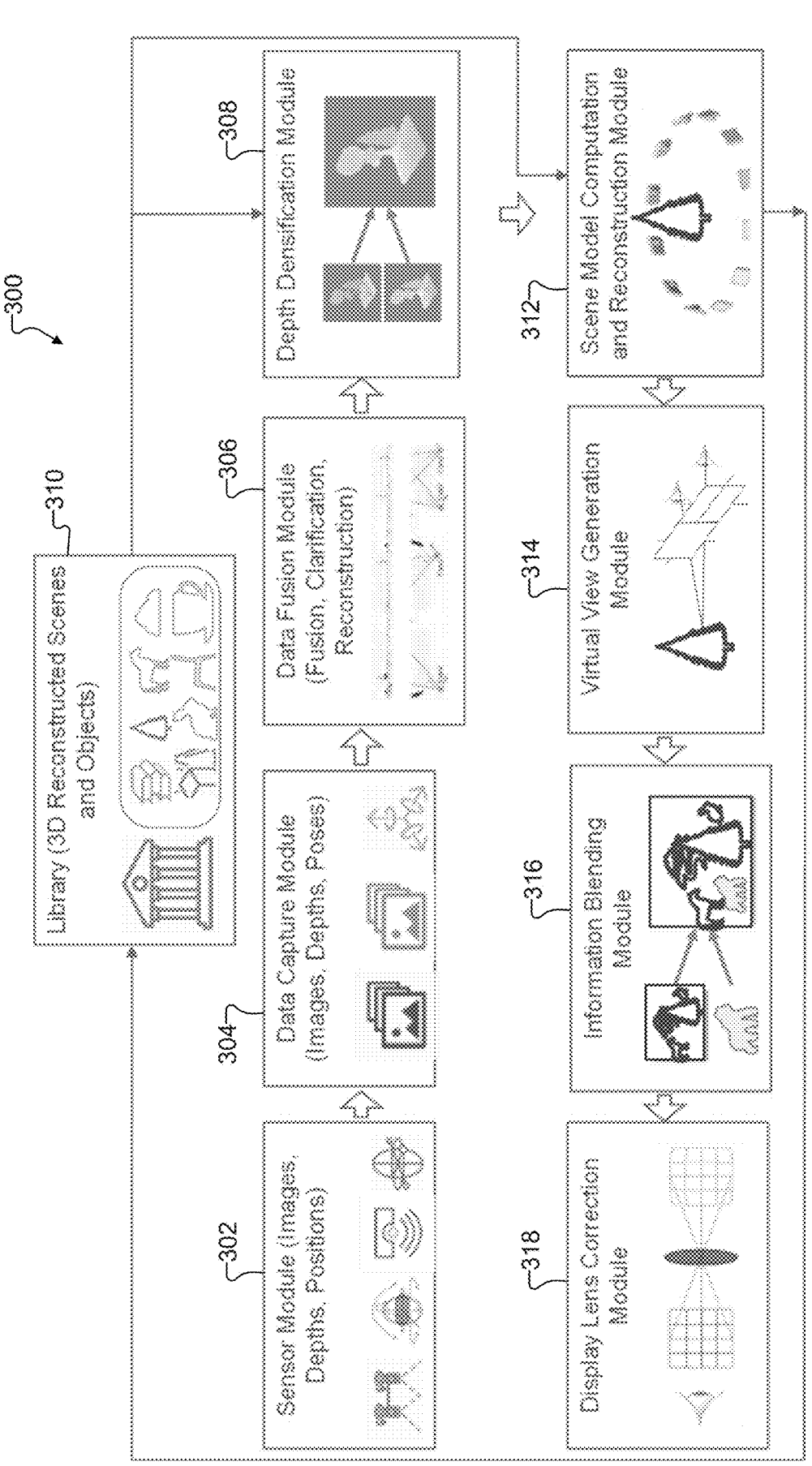
FIG. 3 illustrates an example pipeline for depth-varying reprojection passthrough in VST XR in accordance with this disclosure.

FIG. 3 illustrates an example pipeline 300 for depth-varying reprojection passthrough in VST XR in accordance with this disclosure. For ease of explanation, the pipeline 300 of FIG. 3 is described as being implemented using the electronic device 101 in the network configuration 100 of FIG. 1, where the pipeline 300 may be used to perform at least part of the process 200 of FIG. 2. However, the pipeline 300 may be implemented using any other suitable device(s) and in any other suitable system(s), and the pipeline 300 may perform any other suitable process(es).

As shown in FIG. 3, the pipeline 300 includes various modules that represent components or functions used to implement the various operations of the process 200 described above. In this example, the pipeline 300 includes a sensor module 302 and a data capture module 304. The sensor module 302 can include various sensors 180 used by an XR device, and the data capture module 304 can be used to capture or otherwise obtain various data from the sensors of the sensor module 302. For example, the sensor module 302 may include multiple imaging sensors, at least one depth sensor, and at least one position sensor. The imaging sensors can be used to capture images of scenes. The at least one depth sensor can be used to obtain depth information associated with the scenes, such as in the form of depth maps. A depth map can represent a mapping associated with at least one image, where the mapping estimates depths within a scene captured in a corresponding image. In some cases, the at least one depth sensor may use an active technique to identify depths, such as when signals are transmitted from the at least one depth sensor and reflected signals are received at the at least one depth sensor to support time-of-flight (ToF) measurements. The at least one position sensor can be used to identify a position and an orientation of the XR device within a given environment. In some cases, the at least one position sensor may include pose tracking cameras that capture images and an IMU that senses an orientation of the XR device. The data capture module 304 here can be used to obtain various information, such as captured images of scenes, depth maps or other depth information associated with the scenes, and poses of the XR device.

A data fusion module 306 processes the obtained data in order to fuse the depth data. For example, the data fusion module 306 can be used to fuse depths from the depth sensor(s), depths as measured using the pose sensor(s), and other depth data from other sensors. The data fusion module 306 can also be used to clarify and reconstruct depth maps for captured scenes. For instance, the data fusion module 306 can identify locations where identified depths may appear inaccurate/inconsistent or are missing and replace those depths with other depths (such as averaged depths for surrounding pixels). The data fusion module 306 can also generate fused depth maps based on the received information, where the fused depth maps represent initial estimates of depths within the scenes based on the received information from various sensors.

A depth densification module 308 processes the fused depth maps in order to generate higher-resolution depth maps. For example, the depth densification module 308 may perform depth densification and super-resolution, which increases the number of depth values in the higher-resolution depth maps compared to the fused depth maps. As shown here, in some cases, the depth densification module 308 may be guided at least partially using a library 310, which represents a collection of stored 3D models for reconstructed scenes and reconstructed objects within scenes. The stored 3D models may be associated with scenes and objects that the XR device has encountered previously or that the XR device has been pre-configured to recognize. The depth densification module 308 may use the 3D model of a scene and/or the 3D model(s) of one or more objects when performing depth densification since the depth densification module 308 can use the 3D model(s) to help increase the density of depth values.

A scene model computation and reconstruction module 312 processes higher-resolution depth maps and obtains one or more 3D models from the library 310 (if available) in order to generate or otherwise obtain 3D models for the captured scenes and for the objects within the captured scenes. For example, the scene model computation and reconstruction module 312 can generate or otherwise obtain a 3D model of the actual environment around the XR device and a 3D model of each object detected in the environment around the XR device. In some cases, the 3D model of the environment and/or the 3D model(s) for one or more objects may be retrieved from the library 310 and used by the scene model computation and reconstruction module 312. If a scene or an object within the scene is not recognized (meaning it lacks a 3D model in the library 310), the scene model computation and reconstruction module 312 can generate a new 3D model for that scene or object and store the new 3D model in the library 310. In some embodiments, each of the 3D models in the library 310 may include a 3D mesh representing a geometry of an associated scene or object, a color texture map representing at least one color of the associated scene or object, and one or more parameters identifying at least one of a pattern, dimensions, a pose, and a transformation of the associated scene or object. In this document, the 3D models may be referred to as "volume-based" 3D models since they are volume-based representations of 3D objects.

A virtual view generation module 314 performs reprojection using the 3D models of the scenes and the objects within the scenes in order to generate virtual views of the scenes. As noted above and described in more detail below, the virtual view generation module 314 can perform depth-based reprojection of certain objects and constant-depth reprojection of other objects within the scenes when generating the virtual views. An information blending module 316 can perform blending of real-world information (which may be captured using the see-through imaging sensors) and virtual information (which may be generated by a graphics pipeline or other component). This may allow, for instance, the information blending module 316 to combine representations of real-world objects in the scenes with digital content (like one or more virtual objects) generated by the XR device. The information blending module 316 can perform this blending in order to ensure, for example, that the representations of the real-world objects are properly occluded by the digital content generated by the XR device. A display lens correction module 318 can process the resulting virtual views in order to correct for geometric distortions and chromatic aberrations of one or more display lenses used by the XR device to display the virtual views. For instance, the display lens correction module 318 can use calibration data previously provided to or otherwise obtained by the XR device in order to pre-distort the virtual views prior to presentation of the virtual views by the XR device.

Although FIG. 3 illustrates one example of a pipeline 300 for depth-varying reprojection passthrough in VST XR, various changes may be made to FIG. 3. For example, various components or functions in FIG. 3 may be combined, further subdivided, replicated, omitted, or rearranged and additional components or functions may be added according to particular needs. As a particular example of this, the data fusion module 306 and the depth densification module 308 may be combined and implemented using a trained machine learning model, such as a trained convolution neural network (CNN). The machine learning model may be trained using one or more suitable training datasets, which can be used to train the machine learning model to process inputs like sparse depths and low-resolution depth maps in order to generate dense depth maps. Also, the specific examples of scenes and objects within the scenes shown in FIG. 3 are for illustration and explanation only.

Figure 4:
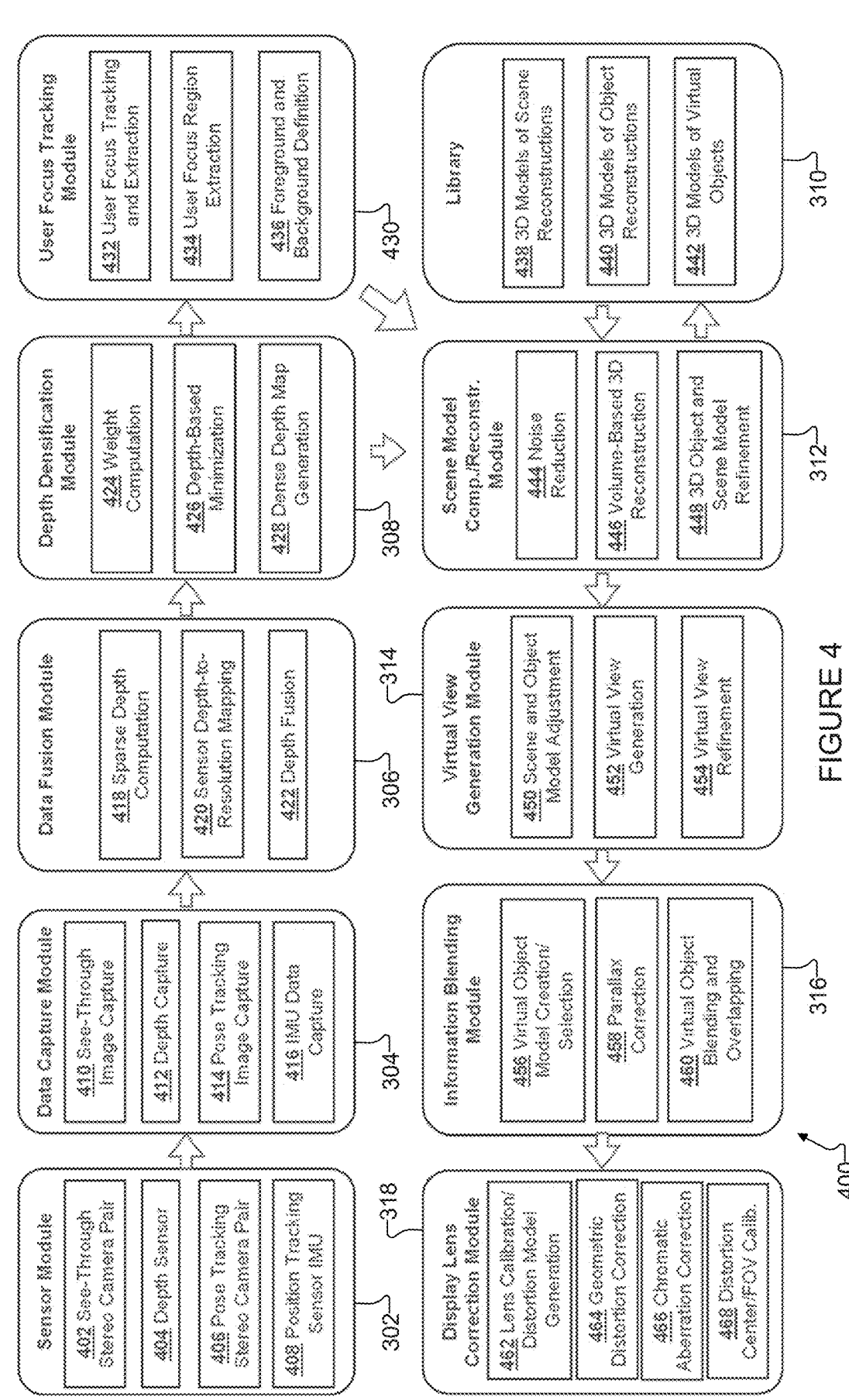
FIG. 4 illustrates a specific example implementation of a pipeline for depth-varying reprojection passthrough in VST XR in accordance with this disclosure.

FIG. 4 illustrates a specific example implementation of a pipeline 400 for depth-varying reprojection passthrough in VST XR in accordance with this disclosure. The pipeline 400 here can represent a more specific implementation of the pipeline 300 of FIG. 3. For ease of explanation, the pipeline 400 of FIG. 4 is described as being implemented using the electronic device 101 in the network configuration 100 of FIG. 1, where the pipeline 400 may be used to perform at least part of the process 200 of FIG. 2. However, the pipeline 400 may be implemented using any other suitable device(s) and in any other suitable system(s), and the pipeline 400 may perform any other suitable process(es).

As shown in FIG. 4, the sensor module 302 can include various sensors used to capture data for depth-varying reprojection. In this example, the sensor module 302 includes a pair of stereo see-through cameras 402, which can be used to capture stereo images of scenes. The sensor module 302 also includes at least one depth sensor 404, such as a time-of-flight (ToF) sensor, which can be used to measure depths within the scenes. The sensor module 302 further includes a pair of pose tracking stereo cameras 406 and a position tracking sensor IMU 408, which can be used to identify the position of the XR device within an environment and an orientation of the XR device within the environment.

The data capture module 304 can include various functions used to capture or otherwise obtain data using the various sensors of the sensor module 302. In this example, the data capture module 304 includes a see-through image capture function 410 used to capture pairs of see-through images generated using the cameras 402. The data capture module 304 also includes a depth capture function 412 used to capture depth maps or other depth information generated using the depth sensor 404. The data capture module 304 further includes a pose tracking image capture function 414 used to capture images generated using the cameras 406. In addition, the data capture module 304 includes an IMU data capture function 416 used to capture information generated using the IMU 408.

The data fusion module 306 can include a sparse depth computation function 418, which is used to generate sparse depth maps or other sparse depth values based on stereo image pairs of scenes. For example, the sparse depth computation function 418 may compute sparse depth values using a structure from motion (SFM) technique based on the stereo image pairs. In other words, the sparse depth computation function 418 may use differences between stereo image pairs to estimate 3D structures from two-dimensional (2D) images and estimate depths to different points within the 2D images based on the 3D structures. A sensor depth-to-resolution mapping function 420 is used to map and transform the sparse depth maps or other sparse depth values from the depth sensor(s) 404, which may involve processing the depth maps or other depth values to have the same resolution as the see-through images captured using the cameras 402. For instance, the mapping function 420 may apply interpolation or other functions to values in the sparse depth maps from the depth sensor(s) 404 in order to increase the resolution of the sparse depth maps. A depth fusion function 422 can fuse the sparse depth points and the mapped depth maps together in order to create fused depth maps associated with the stereo images from the cameras 402. The fused depth maps can still represent sparse depth maps and in some cases may have the same resolution as the see-through images from the cameras 402.

The depth densification module 308 is used to densify or increase the number of depth values in the fused depth maps in order to generate dense depth maps. The depth densification module 308 can also perform super-resolution of the fused depth maps in order to increase the overall resolution of the dense depth maps. The depth densification module 308 can include a weight computation function 424 that determines weights to be applied to depth values in the fused depth maps. The weights can be determined in any suitable manner, such as by using the see-through images, camera poses, and spatial (position) information. This can be done to give higher weights to certain depth estimates and lower weights to other depth estimates. A minimization function 426 uses the weights and the depth values from the fused depth maps to minimize some criteria function, which can involve minimizing the values obtained using the criteria function calculated using the depths and the weights. A dense depth map generation function 428 uses the values determined using the minimization function 426 to generate dense depth maps, which can contain more depth values relative to the original sparse depth maps.

An optional user focus tracking module 430 is shown in FIG. 4, which in some embodiments may be used to identify where a user of an XR device appears to be placing his or her focus within a scene. Note that while this module is not shown in FIG. 3, the user focus tracking module 430 may be used in the pipeline 300. The user focus tracking module 430 can include a user focus tracking and extraction function 432, which is used to perform eye tracking and eye gaze estimation. For instance, the user focus tracking and extraction function 432 can estimate a location where it appears the user is gazing and coordinates of the location where the user appears to be gazing. A user focus region extraction function 434 can identify the general area in which the user appears to be gazing, which can be based on the coordinates of the position where the user appears to be gazing. In some cases, for example, the user focus region extraction function 434 may identify the user's focus region as being the area within some specified distance of the coordinates of the position where the user appears to be gazing. A foreground and background definition function 436 can be used to identify a foreground region of each scene and a background region of each scene. In some embodiments, the foreground region of a scene may be defined as the user's focus region, while other areas may be defined as the background region of the scene. Note, however, that the foreground region and the background region of each scene may be defined in any suitable manner, such as by identifying foreground objects as being within a threshold distance of the XR device.

The library 310 can include various known 3D models for use during scene and object reconstruction. For example, the library 310 may include 3D models 438 of scenes that have been previously encountered and reconstructed. The library 310 may also include 3D models 440 of objects that have been previously encountered and reconstructed. The library 310 may further include 3D models 442 of virtual objects that have been previously generated and possibly inserted into other virtual views. Note that the library 310 may optionally include 3D models of predefined scenes, objects, or virtual objects that may or may not have been previously encountered or generated by the XR device.

The scene model computation and reconstruction module 312 can include a noise reduction function 444 that is used to reduce noise in the dense depth maps from the depth densification module 308, such as by filtering the depth values in the dense depth maps. Note that any suitable filtering or other noise reduction technique(s) may be used by the noise reduction function 444. A volume-based 3D reconstruction function 446 can be used to reconstruct scenes based on 3D models of the scenes and 3D models of objects within the scenes, possibly along with 3D models of virtual objects. For instance, the volume-based 3D reconstruction function 446 can determine how the 3D models of objects within a scene and possibly one or more 3D models of one or more virtual objects can be positioned within a 3D model of that scene. This can result in the generation of a 3D object and scene model for each scene. Note that the 3D models of the scenes and the objects within the scenes can be generated based on the dense depth maps and/or retrieved from the library 310. A refinement function 448 can be used to refine each 3D object and scene model, such as by refining the positions of the objects within the scenes and providing any desired occlusions of objects.

During this 3D model reconstruction, the library 310 can be searched to determine if 3D models for the same or similar scenes or for the same or similar objects are present in the library 310. If a suitably-matching 3D model of a scene or object is found in the library 310, that scene or object model can be used directly during 3D model reconstruction (without recreating the model). If a suitably-matching 3D model of a scene or object is not found in the library 310, the 3D model of the scene or object can be generated by the scene model computation and reconstruction module 312 and stored in the library 310 for future use. In some embodiments, the library 310 may include 3D models of scene reconstructions with depth maps, 3D models of object reconstructions with depth maps, and 3D models of virtual objects with depth maps.

The virtual view generation module 314 can include a scene and object model adjustment function 450, which can adjust the scene and object model for each scene in order to support novel viewpoint renderings. For example, the model adjustment function 450 may transform and scale the 3D models obtained from the library 310 to fit to the current captured scene and may use a scene and object model in order to determine how a particular scene and objects within that particular scene would appear from specific viewpoints. The specific viewpoints may, for instance, represent positions of a user's left and right eyes. A virtual view generation function 452 can generate virtual views from the novel viewpoints using the scene and object models. For instance, the virtual view generation function 452 can perform depth-based reprojection of 3D models of objects within the foreground of the scene to left and right virtual views and perform constant-depth reprojection of 3D models of objects within the background of the scene to the left and right virtual views. A virtual view refinement function 454 can refine the generated virtual views in order to improve the quality of the virtual views, such as by performing ray tracing and lighting operations.

The information blending module 316 can include a virtual object creation and selection function 456, which may be used to select one or more 3D models for one or more virtual objects to be inserted into the left and right virtual views (if desired). For example, the creation and selection function 456 may identify one or more virtual objects to be inserted into the left and right virtual views and determine if any suitable 3D models 442 for the one or more virtual objects already exist in the library 310. If so, the creation and selection function 456 may retrieve the 3D model(s) 442 for the virtual object(s) from the library 310. If not, the creation and selection function 456 can create one or more 3D models for the one or more new virtual objects. As noted above, any new 3D models may be stored in the library 310 for future use. The creation and selection function 456 may use any suitable criterion or criteria in order to determine whether any virtual objects will be inserted into the left and right virtual views and to select one or more virtual objects.

A parallax correction function 458 can be used to perform parallax correction involving the one or more virtual objects to be inserted into the virtual views. The parallax correction can be based on real-world depths within a scene and can account for the fact that each virtual object may appear at different positions within a scene at the user's left and right eyes depending on the apparent depth of the virtual object within the scene. The parallax correction function 458 can use any suitable technique(s) to perform parallax correction. A virtual object blending and overlapping function 460 can blend the one or more virtual objects into a captured scene as represented by the associated left and right virtual views. In some cases, the virtual object blending and overlapping function 460 here may position at least one virtual object over another virtual object or over at least one real-world object within the left and right virtual views prior to blending. The virtual object blending and overlapping function 460 can use any suitable technique(s) to blend image data.

The display lens correction module 318 can include a lens calibration and distortion model generation function 462, which may be used to calibrate one or more lenses or other components of at least one display of an XR device and to generate a model representing how images may be distorted by the one or more lenses. For example, this may involve positioning the one or more lenses or other components of the display(s) of the XR device and determining how the lens(es) may cause distortions of images passing through the lens(es) at the position(s). In some cases, at least some of this information may be predefined and stored at the XR device. A geometric distortion correction function 464 and a chromatic aberration correction function 466 can be used to pre-process the generated virtual views (as modified by the information blending module 316) in order to pre-compensate the virtual views for distortions and aberrations caused by the one or more lenses or other components of the at least one display of the XR device. For instance, the geometric distortion correction function 464 may pre-distort the virtual views in order to pre-compensate for warpings or other spatial distortions created by the lens(es), and the chromatic aberration correction function 466 may pre-distort the virtual views in order to pre-compensate for chromatic aberrations created by the lens(es). A distortion center and field-of-view (FOV) calibration function 468 may be used to calibrate the distortion center and the field-of-view of the one or more lenses, such as by modifying the position(s) and aiming direction(s) of the lens(es).

At this point, the left and right virtual views can be rendered and presented on one or more displays of the XR device. For example, the XR device can display a left virtual image and a corresponding right virtual image to the user, such as on one or more displays 160 of the electronic device 101. This can be repeated any number of times in order to provide sequences of left virtual images and right virtual images to the user. Note that the display(s) used here may represent two separate display panels (such as left and right display panels separately viewable by the eyes of the user) or a single display panel (such as one where left and right portions of the display panel are separately viewable by the eyes of the user).

Although FIG. 4 illustrates one specific example implementation of a pipeline 400 for depth-varying reprojection passthrough in VST XR, various changes may be made to FIG. 4. For example, various components or functions in FIG. 4 may be combined, further subdivided, replicated, omitted, or rearranged and additional components or functions may be added according to particular needs. Also, each of the modules in the pipeline 400 may be implemented in any other suitable manner using functions that perform the desired operations of that module.

Figure 5:
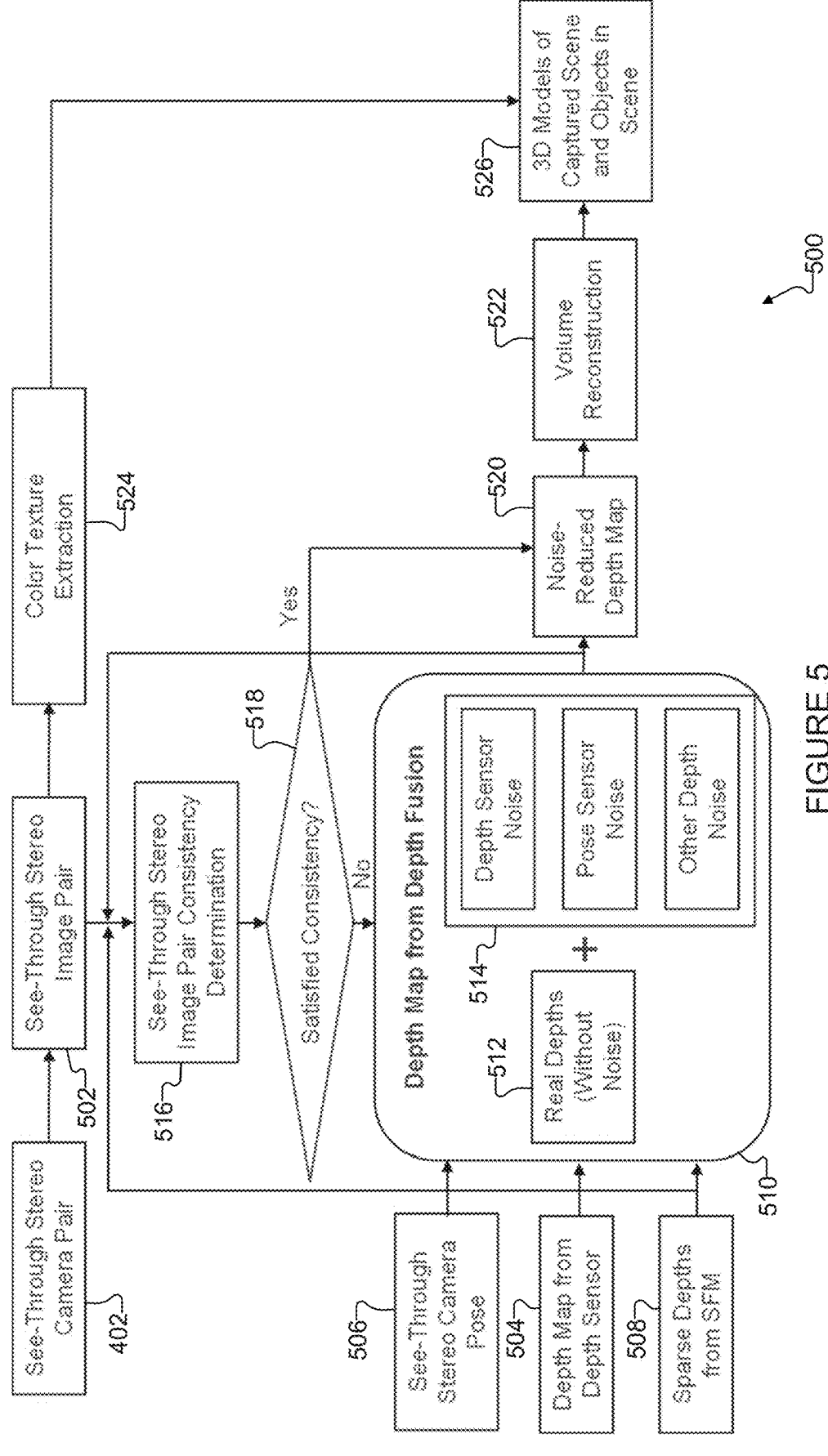
FIG. 5 illustrates an example process for three-dimensional (3D) model reconstruction with image-guided depth fusion in accordance with this disclosure.

FIG. 5 illustrates an example process 500 for 3D model reconstruction with image-guided depth fusion in accordance with this disclosure. The process 500 shown in FIG. 5 may, for example, be performed using the data fusion module 306 and the scene model computation and reconstruction module 312 of FIG. 3 or FIG. 4. As shown in FIG. 5, the process 500 receives pairs of see-through stereo images 502 from the cameras 402, which may be provided by the see-through image capture function 410. The process 500 also receives depth maps 504 or other depth information, which may be based on data from the depth sensor 404 provided by the depth capture function 412. The process 500 further receives see-through camera pose information 506, which may be based on data from the cameras 406 and the pose tracking sensor IMU 408 provided by the pose tracking image capture function 414 and the IMU data capture function 416. In addition, the process 500 receives sparse depth maps or other sparse depths 508, which may be generated by the sparse depth computation function 418.

In this example, the depth maps 504, pose information 506, and sparse depths 508 are processed using a depth map from depth fusion function 510. The depth map from depth fusion function 510 may, for instance, be performed as part of the depth fusion function 422 and the noise reduction function 444 described above. The depth fusion function 510 can combine depth values as determined using the depth maps 504, pose information 506, and sparse depths 508 in order to generate a depth map for each pair of see-through stereo images 502. The resulting depth maps generated by the depth fusion function 510 ideally would only contain real depths 512 (without noise). In reality, however, each depth map generated by the depth fusion function 510 includes the real depths 512 as affected by one or more noise sources 514. Various noise sources 514 may affect the accuracy of the depth maps generated by the depth fusion function 510, such as depth sensor noise affecting the depth maps 504, pose sensor noise affecting the pose information 506, and other depth noise(s).

In order to help compensate for the various noise sources 514, the process 500 uses a stereo image pair consistency determination function 516 in order to identify the consistency or lack of consistency between each pair of stereo see-through images 502 being processed. It is known that a pair of stereo images can include the same points at different locations depending on the depths of those points within a scene being imaged. The stereo image pair consistency determination function 516 can therefore use the consistency of each pair of see-through stereo images 502 along with other information (such as the various inputs to the depth map from depth fusion function 510) to verify the correctness of the depths generated by the depth map from depth fusion function 510 and to detect noises in the resulting depth map.

Figure 6:
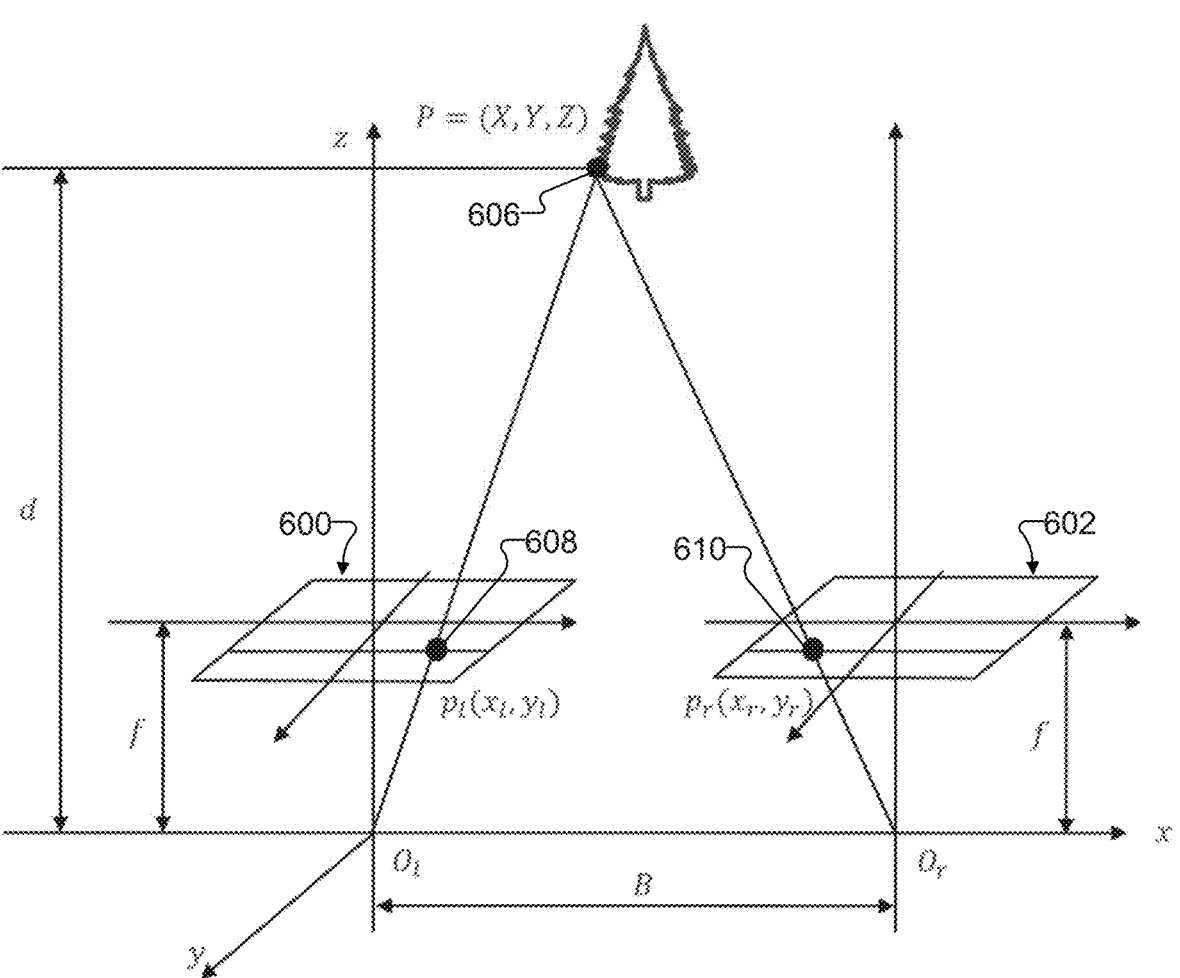
FIG. 6 illustrates an example consistency between left and right images of a stereo image pair in accordance with this disclosure.

FIG. 6 illustrates an example consistency between left and right images of a stereo image pair in accordance with this disclosure. As shown in FIG. 6, a left image 600 and a right image 602 form a stereo image pair and can capture an object (in this case, a tree) within a scene. If a point 606 on the object located at specified coordinates (X, Y, Z) in a 3D space is denoted as P(X, Y, Z), that point 606 is associated with a point 608 in the left image 600 and with a point 610 in the right image 602. The point 608 can be denoted as $p_l(x_l, y_l)$, which represents the projection of the point 606 onto the image plane of the left image 600 at coordinates $(x_l, y_l)$. Similarly, the point 610 can be denoted as $p_r(x_r, y_r)$, which represents the projection of the point 606 onto the image plane of the right image 602 at coordinates $(x_r, y_r)$. Assuming the images 600 and 602 are already rectified such that their correspondence epipolar lines are co-line and parallel with the x axis, there is only disparity between the two points 608 and 610, which exists in the x direction.

The relationship between the left and right images 600 and 602 can be expressed as follows.

$$x_l = x_r = \frac{fB}{d} \tag{1}$$

Here, f represents the focal length of left and right cameras or other imaging sensors, B represents the distance between the left and right cameras, and d represents the depth of the point P(X, Y, Z). Also, $x_l$ represents the x coordinate of the point 608, and $x_r$ represents the x coordinate of the point 610. In FIG. 6, the terms $O_l$ and $O_r$ represent locations where lines that are parallel to the z axis and pass through the centers of the images 600 and 602 meet the x axis (which may also be locations where a user's eyes are expected to be positioned). The term "$x_l$–$x_r$" in Equation (1) represents the disparity between the two points 608 and 610 in the images 600 and 602. Based on this, it is possible to relate the coordinates $(x_l, y_l)$ and $(x_r, y_r)$ and the 3D coordinates (X, Y, Z), such as in the following manner.

$$\begin{cases} x_l = \dfrac{fX}{Z} \\ x_r = \dfrac{f(X - B)}{Z} \\ y_l = y_r = \dfrac{fY}{Z} \end{cases} \tag{2}$$

-continued $$\begin{cases} X = x_l \dfrac{B}{x_l - x_r} \\ Y = y_l \dfrac{B}{x_l - x_r} \\ Z = f = \dfrac{B}{x_l - x_r} \end{cases} \tag{3}$$

It can be seen here that the depth d of the point 606 has a relationship with the positions $(x_l, y_l)$ and $(x_r, y_r)$ of the points 608 and 610, which are related to the consistency between the left and right images 600 and 602 of the stereo image pair. More specifically, when the point 606 is closer to the cameras (meaning the depth d is smaller), the disparity between the points 608 and 610 is larger. When the point 606 is farther from the cameras (meaning the depth d is larger), the disparity between the points 608 and 610 is smaller. It is therefore possible to use disparities between various points 608 and 610 in the see-through stereo images 502 in order to verify if depths determined by the depth map from depth fusion function 510 using other inputs appear to be correct. If a decision function 518 detects that a depth determined by the depth map from depth fusion function 510 generally matches a depth determined using the consistency between the see-through stereo images 502 (such as to within a threshold amount or percentage), little or no modification of the depth determined by the depth map from depth fusion function 510 may be needed. If a depth determined by the depth map from depth fusion function 510 does not generally match a depth determined using the consistency between the see-through stereo images 502, the depth determined by the depth map from depth fusion function 510 may be modified, such as by having the depth map from depth fusion function 510 perform some type of noise reduction. Any suitable noise reduction technique(s) may be used to help make the depth map generated by the depth map from depth fusion function 510 generally consistent with the depths determined using the consistency between the see-through stereo images 502.

This results in the generation of a noise-reduced depth map 520 for each pair of see-through stereo images 502. Each noise-reduced depth map 520 can be processed using a volume reconstruction function 522. The volume reconstruction function 522 operates to convert depth data in the noise-reduced depth maps 520 into 3D models of captured scenes and objects within the scenes. The volume reconstruction function 522 can use any suitable technique(s) for generating 3D models of scenes and objects, such as Truncated Signed Distance Field (TSDF) volume reconstruction. A color texture extraction function 524 can process the see-through stereo images 502 in order to extract texture information in different colors of the see-through stereo images 502, such as in the red, green, and blue image data of the see-through stereo images 502. The extracted color textures are combined with the 3D models generated by the volume reconstruction function 522 in order to generate 3D models 526 that represent the scenes captured in the see-through stereo images 502 and objects within the scenes. The 3D models 525 can optionally be stored in the library 310 as the 3D models 438 of scenes and the 3D models 440 of objects.

Although FIG. 5 illustrates one example of a process 500 for 3D model reconstruction with image-guided depth fusion, various changes may be made to FIG. 5. For example, various functions in FIG. 5 may be combined, further subdivided, replicated, omitted, or rearranged and additional components or functions may be added according to particular needs. Although FIG. 6 illustrates one example of consistency between left and right images of a stereo image pair, various changes may be made to FIG. 6. For instance, the contents of FIG. 6 are merely meant to illustrate how points' depths can affect positions of those points in captured images. The specific example shown in FIG. 6 does not limit the scope of this disclosure to any particular scene or scene contents.

As noted above, there are various ways in which a scene can be segmented into a foreground region with one or more foreground objects and a background region with one or more background objects. Example approaches for performing this segmentation include segmentation based on user focus and segmentation based on distance. The following describes one example implementation of each of these approaches.

Figure 7:
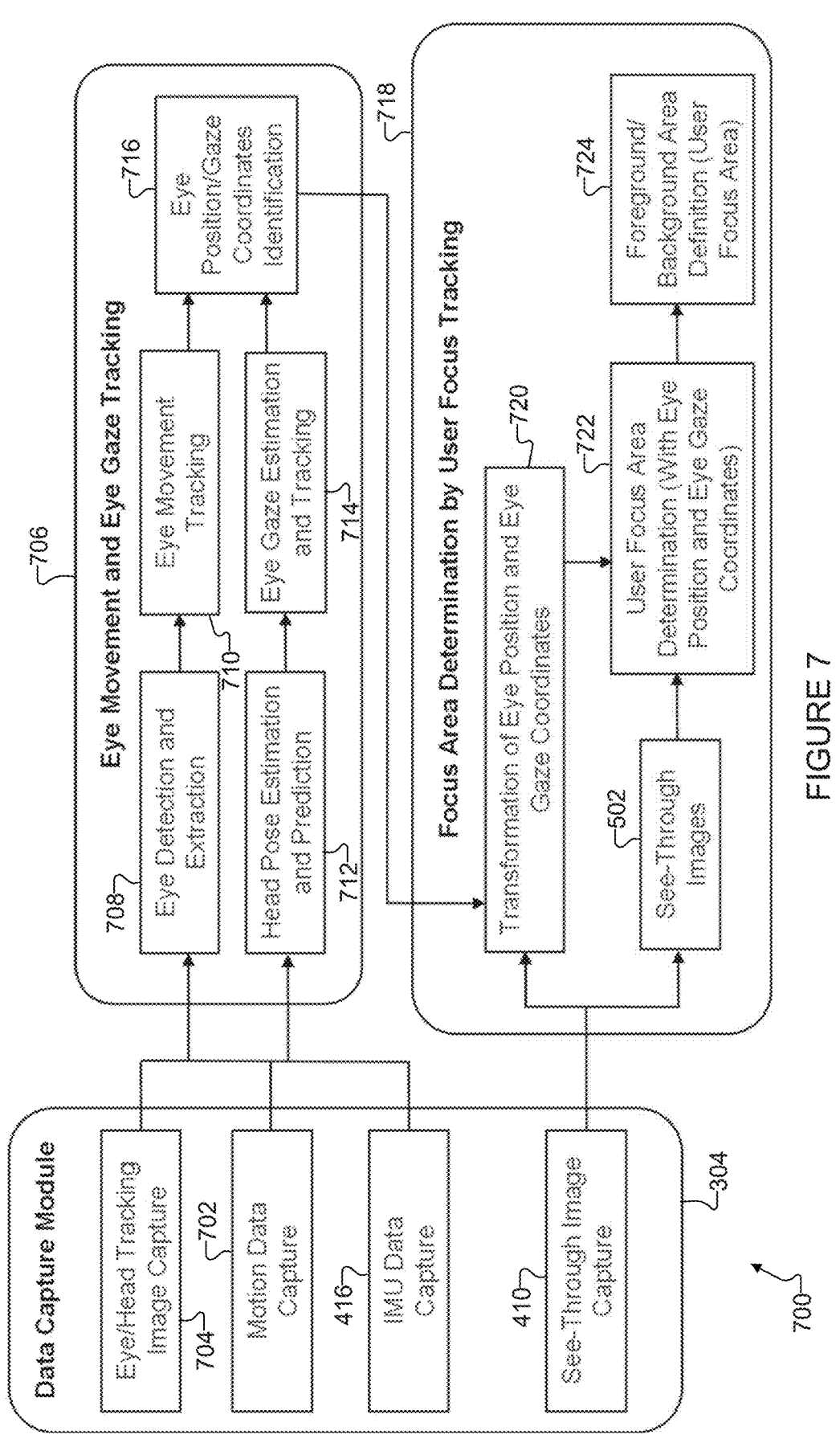
FIG. 7 illustrates an example process for separating a scene into foreground and background objects based on user focus in accordance with this disclosure.

FIG. 7 illustrates an example process 700 for separating a scene into foreground and background objects based on user focus in accordance with this disclosure. The process 700 shown in FIG. 7 may, for example, be performed using the data capture module 304 of FIG. 3 or FIG. 4 and the user focus tracking module 430 of FIG. 4. For ease of explanation, the process 700 of FIG. 7 is described as being performed by or implemented using the electronic device 101 in the network configuration 100 of FIG. 1. However, the process 700 may be implemented using any other suitable device(s) and in any other suitable system(s).

As shown in FIG. 7, the data capture module 304 can include the see-through image capture function 410 used to capture pairs of see-through images generated using the cameras 402. The data capture module 304 can also include the IMU data capture function 416 used to capture information generated using the IMU 408. The data capture module 304 can further include a motion data capture function 702 used to capture information generated using one or more motion sensors 180, which can sense motion of the XR device. In addition, the data capture module 304 can include an eye/head tracking image capture function 704, which can capture images associated with the eyes or head of the user.

The information captured using the IMU data capture function 416, the motion data capture function 702, and the eye/head tracking image capture function 704 is provided to an eye movement and eye gaze tracking operation 706. The tracking operation 706 operates to estimate where the user of the XR device appears to be looking (gazing). The tracking operation 706 can include an eye detection and extraction function 708, which can identify and isolate the eyes of the user's face (such as in images of at least part of the user's face). An eye movement tracking function 710 can use the isolated images of the user's eyes in order to estimate how the user's eyes are moving over time. For instance, the eye movement tracking function 710 may determine whether the user appears to be looking in the same general direction over time or is switching his or her focus. A head pose estimation and prediction function 712 can process the information in order to estimate/predict the exact pose of the user's head. An eye gaze estimation and tracking function 714 can use the pose of the user's head in order to estimate where the user appears to be gazing and to track where the user appears to be gazing over time. An eye position and gaze coordinates identification function 716 uses the results of the eye movement tracking and the gaze estimation and tracking in order to identify a location where the user appears to be gazing within a scene and the coordinates of that location. Note that the eye movement and eye gaze tracking operation 706 may use any suitable technique(s) to identify and track locations where a user appears to be gazing.

The see-through stereo images 502 and the estimated location of the user's gaze are provided to a focus area determination operation 718, which can identify an area in which the user is focused based on the tracking. The focus area determination operation 718 can include a transformation function 720, which may transform the eye position and coordinates determined by the tracking operation 706 into a different coordinate system. For example, the transformation function 720 may transform the eye position and coordinates determined by the tracking operation 706 from the coordinate system used by the tracking operation 706 into coordinates in a see-through camera coordinate system used by the cameras 402. A user focus area determination function 722 can process the transformed eye position and coordinates and the see-through images 502 in order to dynamically determine the user's focus area within the scene as captured in the see-through images 502. For instance, the user focus area determination function 722 may identify the location in a see-through image 502 where the user appears to be gazing and define a region around that location, such as a region within a specified distance of the identified location.

A foreground/background area definition function 724 can use the user's focus region to define the foreground and the background of the see-through image 502. For instance, the definition function 724 can treat the user's focus region for each see-through image 502 as the foreground of the see-through image 502, and the definition function 724 can treat all other regions of each see-through image 502 as the background of the see-through image 502. At that point, the process 200 can perform depth-based reprojection of one or more 3D models associated with one or more objects within the foreground of the see-through image 502, and the process 200 can perform constant-depth reprojection of one or more 3D models associated with one or more objects within the background of the see-through image 502. This can be repeated across an entire sequence of pairs of see-through images 502 in order to account for changing focus regions of the user.

Note that if no user focus region can be determined here, all objects in the see-through images 502 may be treated as background objects. In that case, 3D models for all objects captured in the see-through images 502 can undergo constant-depth reprojection in order to generate virtual views for presentation by the XR device. If and when the user focuses on a particular region, the process 700 can update the virtual views by performing depth-based reprojection for any object(s) now within the user's focus region.

Figure 8:
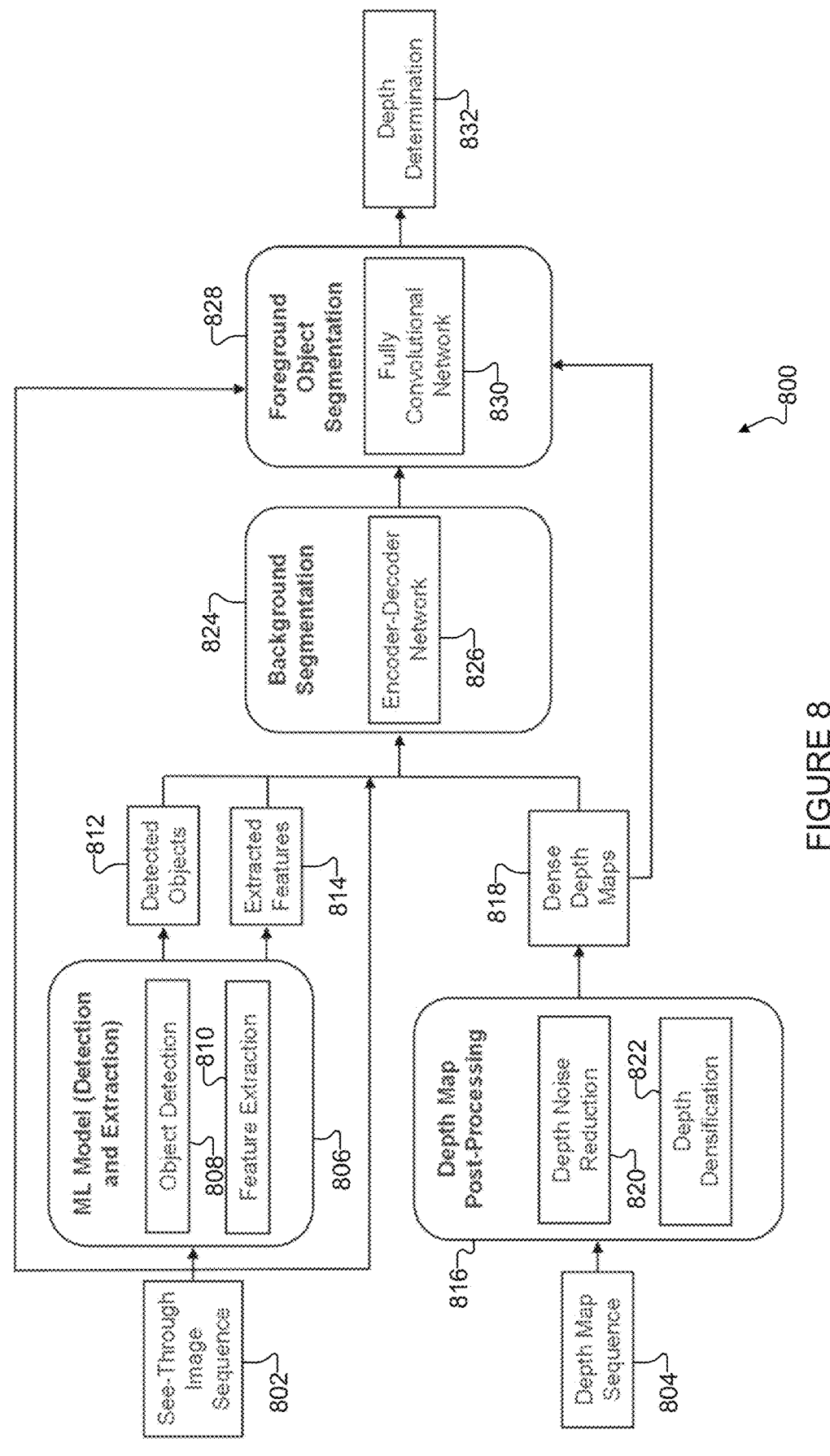
FIG. 8 illustrates an example process for separating a scene into foreground and background objects using machine learning in accordance with this disclosure.

FIG. 8 illustrates an example process 800 for separating a scene into foreground and background objects using machine learning in accordance with this disclosure. The process 800 shown in FIG. 8 may, for example, be performed using the depth densification module 308, the scene model computation and reconstruction module 312, and the virtual view generation module 314 of FIG. 3 or FIG. 4. For ease of explanation, the process 800 of FIG. 8 is described as being performed by or implemented using the electronic device 101 in the network configuration 100 of FIG. 1. However, the process 800 may be implemented using any other suitable device(s) and in any other suitable system(s).

As shown in FIG. 8, the process 800 receives a sequence 802 of see-through images, which can be captured using the cameras 402. The process 800 also receives a sequence 804 of depth maps, which can be captured using at least one depth sensor 404 or generated in any other suitable manner.

The sequence 804 of depth maps corresponds to the sequence 802 of see-through images.

The sequence 802 of see-through images is provided to a trained machine learning model 806, which has been trained to perform object detection and extraction. The machine learning model 806 can include or support an object detection function 808 and a feature extraction function 810. The object detection function 808 may operate to detect specific objects contained in the sequence 802 of see-through images, and the feature extraction function 810 may be trained to identify specific features of the objects detected in the sequence 802 of see-through images. This results in the identification of detected objects 812 and extracted features 814. The machine learning model 806 represents any suitable machine learning-based architecture that has been trained to perform object identification and feature extraction, such as a deep neural network (DNN) or other neural network. As a particular example, the machine learning model 806 may represent a DNN having a multi-scale architecture with 2D convolutional networks. After training (such as with labeled datasets), the machine learning model 806 can detect objects of different sizes in captured scenes. The DNN may also include convolutional layers for extracting multi-scale image features of image areas containing the detected objects.

A depth map post-processing operation 816 processes the sequence 804 of depth maps in order to generate dense depth maps 818. For example, the depth map post-processing operation 816 can include a depth noise reduction function 820 and a depth densification function 822. These functions 820 and 822 may be implemented in the same or similar manner as corresponding functions described above. In some cases, the depth map post-processing operation 816 may be implemented using a trained machine learning model that has been trained to reduce or remove noise, such as noise introduced by depth capturing and depth reconstruction. The machine learning model can also be trained to perform hole filling in order to fill in missing depth values. If necessary, the machine learning model can further perform super-resolution to upscale depth maps to the same resolution as the see-through images. The machine learning model represents any suitable machine learning-based architecture that has been trained to perform noise reduction and/or depth densification, such as a DNN or other neural network.

A background segmentation function 824 processes the sequence 802 of see-through images, detected objects 812, extracted features 814, and dense depth maps 818 in order to identify background objects in the see-through images. For example, the background segmentation function 824 may generate and output images containing the background objects in the see-through images. In some cases, the background segmentation function 824 can process patches of detected objects 812, the extracted features 814 of the detected objects 812, and the dense depth maps 818 of the detected objects. In some embodiments, the background segmentation function 824 may be implemented using a trained machine learning model, such as a model having a trained encoder-decoder network 826. Also, in some embodiments, the trained machine learning model may be trained using an L2 loss criterion. During training, the machine learning model can learn background image information contained in training images and learn how to generate images containing the identified background image information.

A foreground object segmentation function 828 processes the sequence 802 of see-through images, dense depth maps

818, and background images generated by the background segmentation function 824 in order to identify foreground objects in the see-through images. For example, the foreground object segmentation function 828 can be used to segment foreground objects from the sequence 802 of see-through images. In some embodiments, the foreground object segmentation function 828 may be implemented using a trained machine learning model, such as a model having a trained fully convolutional network 830. Also, in some embodiments, the trained machine learning model may be trained using a cross-entropy loss criterion. During training, the machine learning model can learn to identify foreground objects contained in training images and learn how to segment the foreground objects from the training images. A depth determination function 832 can use the results from the foreground object segmentation function 828 (and possibly the background segmentation function 824) and can automatically generate a depth threshold that may be used to separate foreground objects from background images.

With respect to the foreground object segmentation function 828, the problem of foreground object segmentation can be viewed as a "two-class classification" issue. That is, each pixel in the see-through images may be classified by the foreground object segmentation function 828 into one of two classes, namely a first class if the pixel is part of a foreground object and a second class if the pixel is not part of a foreground object. The fully convolutional network 830 may use a cross-entropy loss criterion (also called a loss function) for training and classification. The cross-entropy loss can be used when adjusting model weights during training. Smaller losses can represent better-trained models, and a cross-entropy loss of zero is indicative of a perfect model. Since the fully convolutional network 830 is used with two classes, a binary cross-entropy loss function may be used. In some cases, this loss function may be expressed as follows.

$$L_{binary} = -[v \log(p) + (1-v)\log(1-p)] \qquad (4)$$

Here, $L_{binary}$ represents the binary loss, v represents a truth value, and p represents a softmax probability for the class that has the truth value v. In some cases, the softmax probability can be expressed as follows.

$$p_i = \frac{\exp(y_i)}{\sum_{j=1}^{n} y_j} \qquad (5)$$

Here, $p_i$ represents the softmax probability for class i, and $y_j$ represents the logit of class j. In some cases, the average cross-entropy across all data examples used during training can be determined. In some cases, the average cross-entropy can be expressed as follows.

$$L_{binary} = -\frac{1}{N}\left(\sum_{j=1}^{n}(v_j\log(p_j) + (1-v_j)\log(1-p_j))\right) \qquad (6)$$

Here, N represents the number of data points.

In some embodiments, one or more of the machine learning models used in the process 800 can be trained using supervised learning. Also, in some embodiments, one or more of the machine learning models used in the process 800 can be trained using training data for different locations or environment types. Example locations or environment types may include kitchens, living rooms, bedrooms, offices, lobbies, and other locations. Objects in the various locations or environments may be provided with generic identifiers, such as surface-desk, surface-wall, cup, keyboard, mouse, medicine bottle, etc. This may allow the one or more machine learning models to provide different threshold distances for segmenting foreground and background objects in different environments. Ideally, the one or more machine learning models used in the process 800 are adequately trained to determine near (foreground) and far (background) designations of new objects in new scenes.

Note that the operation of the process 800 can vary based on other factors unrelated to actual see-through image contents. For instance, if an XR device is experiencing high computational loads or high heat or the XR device needs to save power, the process 800 can be configured to segment more objects into the background, such as based on a likelihood of each object being the subject of a user interaction and/or user interest. Since background objects can undergo constant-depth reprojection rather than depth-based reprojection, this can help to reduce the computational load and/or power usage by the XR device. As another example, the one or more machine learning models used in the process 800 may learn relationships between the distance threshold and a particular user's experiences, preferences, and/or interests.

Although FIG. 7 illustrates one example of a process 700 for separating a scene into foreground and background objects based on user focus and FIG. 8 illustrates one example of a process 800 for separating a scene into foreground and background objects using machine learning, various changes may be made to FIGS. 7 and 8. For example, various components or functions in each of FIGS. 7 and 8 may be combined, further subdivided, replicated, omitted, or rearranged and additional components or functions may be added according to particular needs. Also, while FIGS. 7 and 8 illustrate two example techniques for separating a scene into foreground and background objects, a scene may be segmented in any other suitable manner. For instance, a default threshold distance may be used, rather than having one or more machine learning models identify a dynamic threshold distance. In some cases, the default threshold distance may be based on longtime experiences by the user. As another example, a user may manually set the threshold distance, such as based on the user's own experiences, requirements, or preferences.

Figure 9:
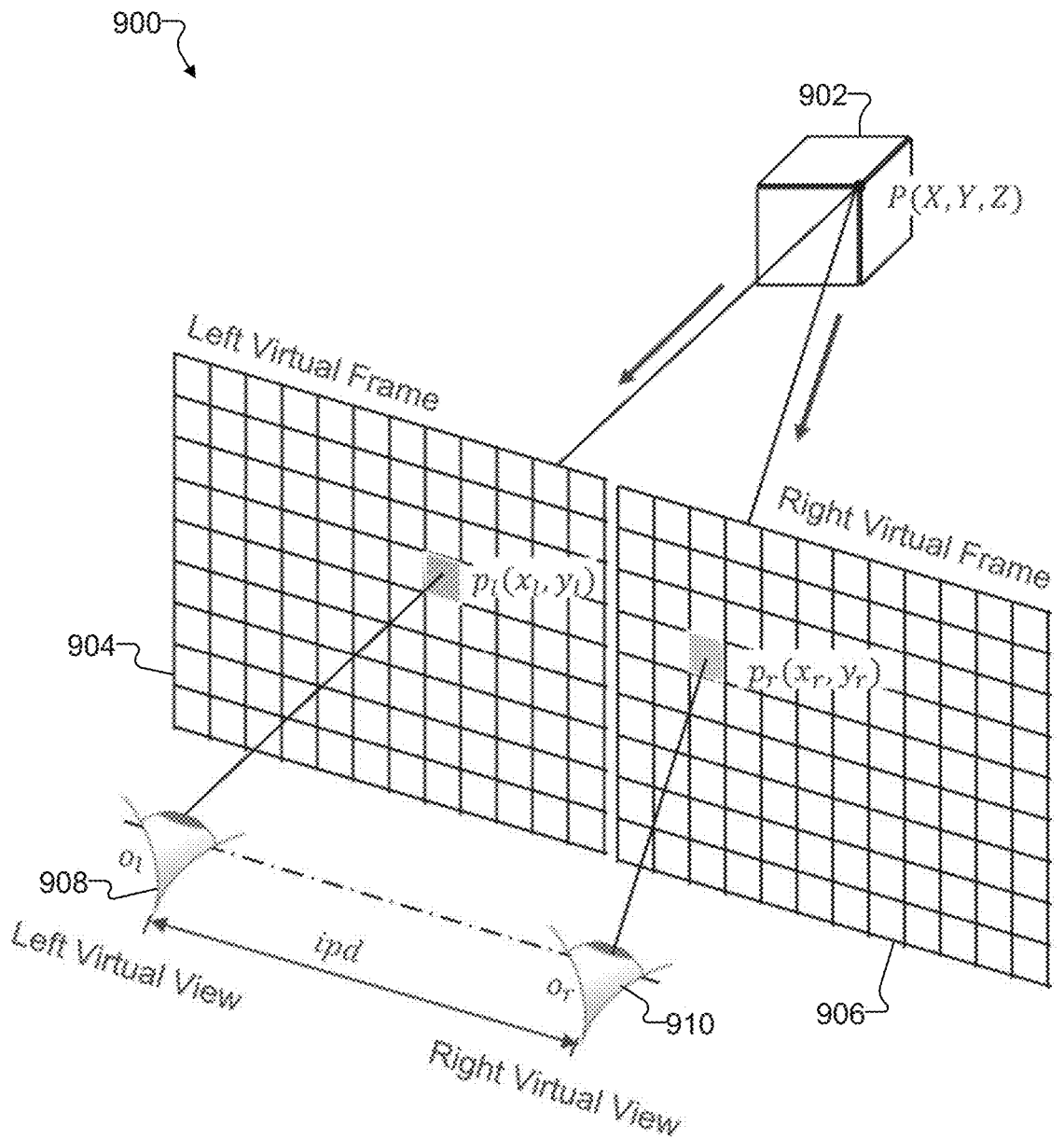
FIG. 9 illustrates an example depth-based reprojection for generating left and right virtual views in accordance with this disclosure.

FIG. 9 illustrates an example depth-based reprojection 900 for generating left and right virtual views in accordance with this disclosure. For example, the depth-based reprojection 900 may be performed by the virtual view generation function 452 when reprojecting the 3D model of an object determined to be in the foreground of a scene. As described above, using various operations in the process 200 or the pipeline 300 or 400, it is possible to obtain 3D models for a captured scene and for objects in the scene. If available, one or more of the 3D models may be obtained from the library 310.

As shown in FIG. 9, the depth-based reprojection 900 can be performed to reproject a 3D model 902 of an object (which in this example is defined as a cube) to a left virtual image frame 904 and a right virtual image frame 906. The left virtual image frame 904 is used to create a virtual view for the left eye 908 of a user, and the right virtual image frame 906 is used to create a virtual view for the right eye 910 of the user. Here, it is assumed that a virtual camera position is located at the position of the user's left eye 908 and that a virtual camera position is located at the position of the user's right eye 910. Ideally, the virtual views are created to give the appearance that the virtual views are captured using cameras at the locations of the user's eyes, even though the cameras are actually positioned elsewhere. In this example, ipd (inter-pupillary distance) is used to represent the separation of the virtual camera positions.

Based on Equation (2) above, it is possible to project points of the 3D model 902 onto the left virtual image frame 904 and the right virtual image frame 906. For example, suppose P(X, Y, Z) is a point on the 3D model 902, p $(x_l, y_l)$ is a projection of P(X, Y, Z) on the left virtual frame 904, and $p_r$ $(x_r, y_r)$ is a projection of P(X, Y, Z) on the right virtual frame 906. Based on Equation (2), the following relationship can be obtained.

$$\begin{cases} x_l = \dfrac{fX}{Z} \\ x_r = \dfrac{f(X - ipd)}{Z} \\ y_l = y_r = \dfrac{fY}{Z} \end{cases} \quad (7)$$

Thus, this relationship can be used to reproject this point of the 3D model 902 onto the left virtual image frame 904 and the right virtual image frame 906. Repeating this projection for a number of points of the 3D model 902 can reproject the 3D model 902 onto each of the left virtual image frame 904 and the right virtual image frame 906.

Note that this depth-based reprojection may occur only for 3D models related to objects identified as being in the foreground of a scene (as defined by the user's focus, a threshold distance, or other parameter). One advantage of this approach is that depth-based reprojection, which reprojects objects at different depth levels to generate the virtual view images, can be limited to objects in which the user is most likely interested. Other objects can be treated as background objects, in which case a simpler constant-depth reprojection of those objects' 3D models may be performed.

Figure 10:
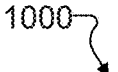
FIG. 10 illustrates an example depth-varying reprojection for selected objects at different depth levels in accordance with this disclosure.

FIG. 10 illustrates an example depth-varying reprojection 1000 for selected objects at different depth levels in accordance with this disclosure. For example, the depth-varying reprojection 1000 may be performed by the virtual view generation function 452 when reprojecting the 3D models of multiple objects at different depths within a scene 1002. In this example, the scene 1002 includes three objects, and two threshold distances $d_1$ and $d_2$ are identified. A left virtual image frame 1004 and a right virtual image frame 1006 of the scene 1002 can be generated, such as in the manner described above.

If the process 800 determines that the threshold distance $d_1$ should be used, only the front-most object (namely a horse) in the scene 1002 may undergo depth-based reprojection, while other objects can undergo constant-depth reprojection when generating the left virtual image frame 1004 and the right virtual image frame 1006. If the process 800 determines that the threshold distance $d_2$ should be used, only the two front-most objects (namely a horse and a tiger) in the scene 1002 may undergo depth-based reprojection, while other objects can undergo constant-depth reprojection when generating the left virtual image frame 1004 and the right virtual image frame 1006. In some cases, the constant-depth reprojection may be generated at the identified threshold distance $d_1$ or $d_2$.

This approach for performing depth-based reprojection for some objects and constant-depth reprojection for other objects can be very useful for video see-through XR applications. For example, suppose a user is using a physical keyboard with an XR headset. The user can use his or her fingers to type on the physical keyboard, and the XR headset can identify which keys are depressed by the user in order to obtain information from the user (even if the physical keyboard is not connected to the XR headset and may not even be operational or receiving power). The physical keyboard can be rendered in virtual images as accurately as possible so that the XR headset can accurately identify the keys being depressed by the user. Other objects can be treated as background objects, and their 3D models can be subjected to constant-depth reprojection. This approach can also be beneficial since accurate depth reconstruction can be computationally expensive, so performing depth-based reprojection with accurate depths for only one or some objects (but not all objects) in a scene can reduce the computational complexity of the virtual view generation process.

Note that there are some cases in which at least one part of an object may be within a specified threshold distance (either a threshold distance determined using the process 800 or a threshold distance determined in any other suitable manner), while at least one other part of the object may not be within the specified threshold distance. In these cases, the object may be treated as a foreground object or as a background object, which may depend on a default setting or user setting of an XR device or some other criterion or criteria. In some embodiments, the object may be treated as a foreground object since at least part of the object is within the threshold distance. In particular embodiments, at least one certain type of object may be treated as a foreground object if at least part of the object is within the threshold distance, while at least one other type of object may be treated as a background object if at least part of the object is not within the threshold distance.

Although FIG. 9 illustrates one example of a depth-based reprojection 900 for generating left and right virtual views and FIG. 10 illustrates one example of a depth-varying reprojection 1000 for selected objects at different depth levels, various changes may be made to FIGS. 9 and 10. For example, the specific examples of scenes and objects within the scenes shown in FIGS. 9 and 10 are for illustration and explanation only.

Figure 11:
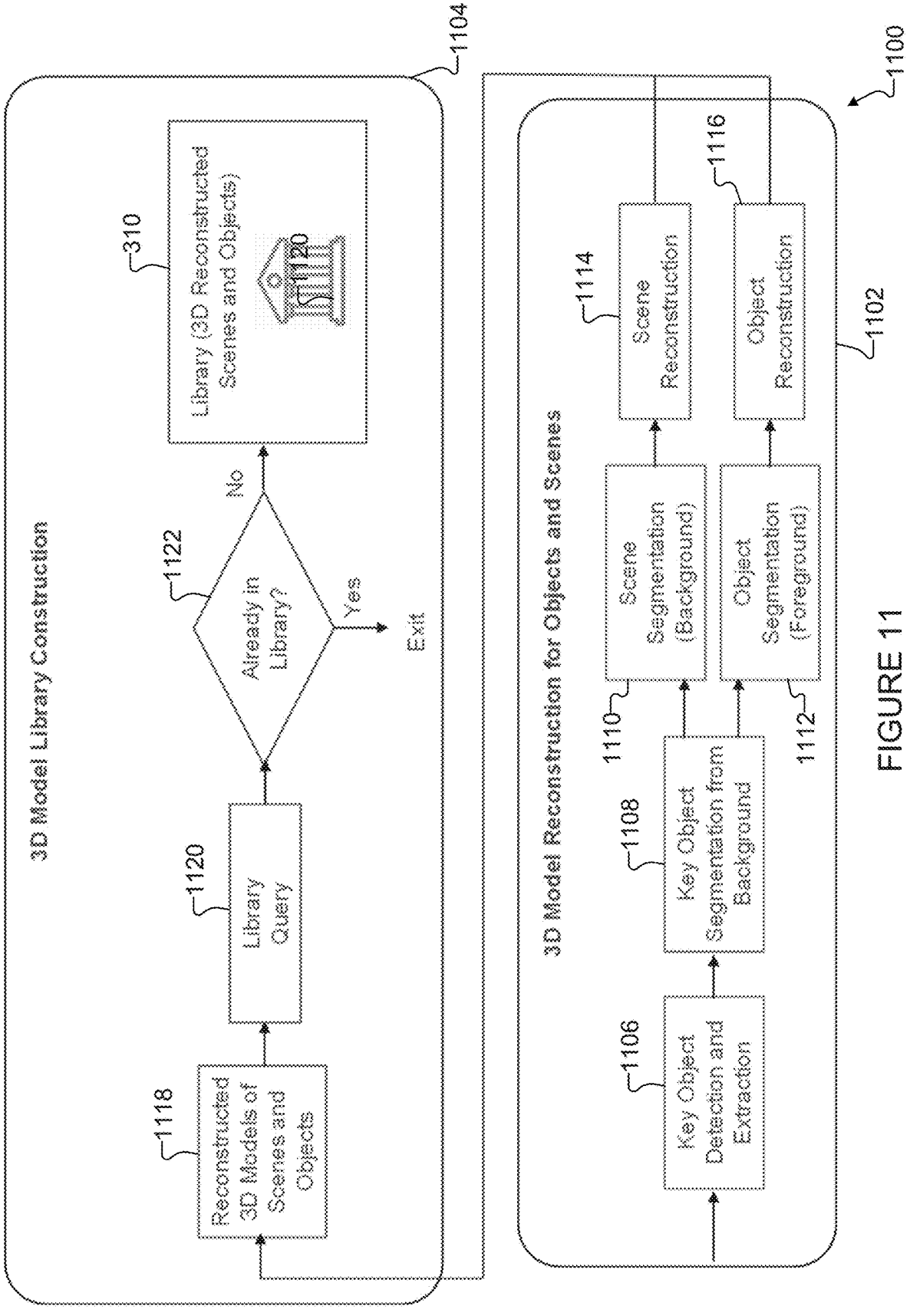
FIG. 11 illustrates an example process for building a library of 3D reconstructed scenes and objects in accordance with this disclosure.

As described above, the library 310 can be used to store 3D models for scenes, objects, and possibly virtual objects. At least some of the 3D models stored in the library 310 may include 3D models for scenes previously encountered by an XR device and 3D models for objects in those scenes. FIG. 11 illustrates an example process 1100 for building a library 310 of 3D reconstructed scenes and objects in accordance with this disclosure. As shown in FIG. 11, the process 1100 includes two general parts, namely a subprocess 1102 for reconstructing 3D models for scenes and objects and a subprocess 1104 for library construction. Note that the subprocess 1102 shown here may actually be used as part of the scene model computation and reconstruction module 312 described above, such as when the scene model computation and reconstruction module 312 uses the subprocess 1102 to generate 3D models for scenes captured in see-through images 502 and for objects in those scenes.

The subprocess 1102 in this example can include a key object detection and extraction function 1106, which can process see-through images 502 in order to identify certain types of objects contained in the see-through images 502 and to extract those objects from the see-through images 502. In some cases, the detection and extraction function 1106 may be used to identify and extract predefined types of objects from images of scenes. In other cases, the detection and extraction function 1106 may be more dynamic, such as when the detection and extraction function 1106 is configured to identify objects based on the discrete or separate structures of the objects in the see-through images 502. A key object segmentation function 1108 may be used to remove the identified key objects from the see-through images 502, thereby leaving the backgrounds in the processed images. This results in the generation of scene segmentations 1110 that include only the backgrounds and any non-key objects contained in the see-through images 502 and object segmentations 1112 that include only the key objects extracted from the see-through images 502.

The scene segmentations 1110 are provided to a scene reconstruction function 1114, which can process the scene segmentations 1110 in order to generate 3D models of the scenes captured in the see-through images 502. The scene reconstruction function 1114 may use any suitable technique (s) to generate 3D models of the scenes captured in the see-through images 502 using the scene segmentations 1110, such as a structure from motion technique. The object segmentations 1112 are provided to an object reconstruction function 1116, which can process the object segmentations 1112 in order to generate 3D models of the objects captured in the see-through images 502. The object reconstruction function 1116 may use any suitable technique(s) to generate 3D models of the objects captured in the see-through images 502 using the object segmentations 1112, such as a structure from motion technique.

The subprocess 1104 in this example can receive 3D models 1118, which can include the 3D models of scenes generated by the scene reconstruction function 1114 and the 3D models of objects generated by the object reconstruction function 1116. A library query function 1120 can be used to determine if each 3D model 1118 is identical or similar to any 3D models in the library 310. A determination function 1122 can process the query results and can either store a 3D model 1118 in the library 310 or not store the 3D model 1118 in the library 310. For example, if a 3D model 1118 is new and has not been previously stored in the library 310, the 3D model 1118 can be stored in the library 310.

In some embodiments, each 3D model can be defined using the following types of data. A 3D mesh can be used to represent the geometry of the associated scene or object, such as when the 3D mesh describes the 3D shape of the associated scene or object. A color texture map can be used to represent the color(s) of the associated scene or object, such as when the color texture map describes the color(s) of surfaces or other areas of the associated scene or object. One or more parameters may identify at least one of a pattern, dimensions, a pose, and a transformation of the associated scene or object. For example, one or more of these parameters may be attached to a 3D model when the 3D model is reconstructed. With these parameters, it is possible to unify a scene or object based on a unit scene or object with a unified size, a unified pose, and a unified transformation.

In order to use the contents of the library 310, the scene model computation and reconstruction module 312 can use camera tracking in order to obtain camera pose and object detection information, which can be done to detect objects in captured scenes. The scene model computation and reconstruction module 312 can perform the functions 1106, 1108, 1114, 1116 in order to segment the captured scenes into foregrounds and backgrounds, and objects in the foregrounds can be used to search the library 310 for potentially-matching 3D models (such as by using pattern matching). The pattern matching here can look for 3D models having the same or similar 3D mesh, the same or similar color texture map, and the same or similar parameter(s) of the object (at least to within some threshold amount or percentage). If a match is found, the 3D model from the library 350 can be used by the volume-based 3D reconstruction function 446. For instance, a transformation can be determined based on the current camera pose and used to transform a unit object from the library 310 to the captured scene, and the transformed object can be fit to the position in the scene with a computed scale factor and orientation. After all objects are processed (by re-using 3D models from the library 310 and/or reconstructing new 3D models), left and right virtual views can be generated as discussed above while using accurate depth-based reprojection for the foreground object (s) and simpler constant-depth reprojection for the background object(s).

In some cases, the 3D models 1118 in the library 310 may include predefined or other 3D models that are provided by an external source, such as a manufacturer of the XR device. Thus, the library 310 may be constructed in both an online manner and an offline manner. In the online case, 3D models generated by an XR device can be stored in the library 310 as 3D models are produced for scenes or objects not previously encountered by the XR device. In the offline case, images of 3D scenes may be captured and used to reconstruct 3D models of scenes and objects (which may or may not occur at the XR device), and the 3D models can be added to the library 310.

Although FIG. 11 illustrates one example of a process 1100 for building a library 310 of 3D reconstructed scenes and objects, various changes may be made to FIG. 11. For example, the use of the library 310 is optional, so the subprocess 1104 shown in FIG. 11 may be omitted.

In the discussion above, an XR device has been described as capturing and processing see-through images in order to generate virtual views using the see-through images, such as by reprojecting 3D models for foreground and background objects. This can be done repeatedly, such as continuously, as a user moves the XR device within an environment. In some instances, however, it may be possible to generate some virtual views in this manner and then generate additional virtual views based on the earlier virtual views (rather than based on image capture and processing operations).

Figure 12:
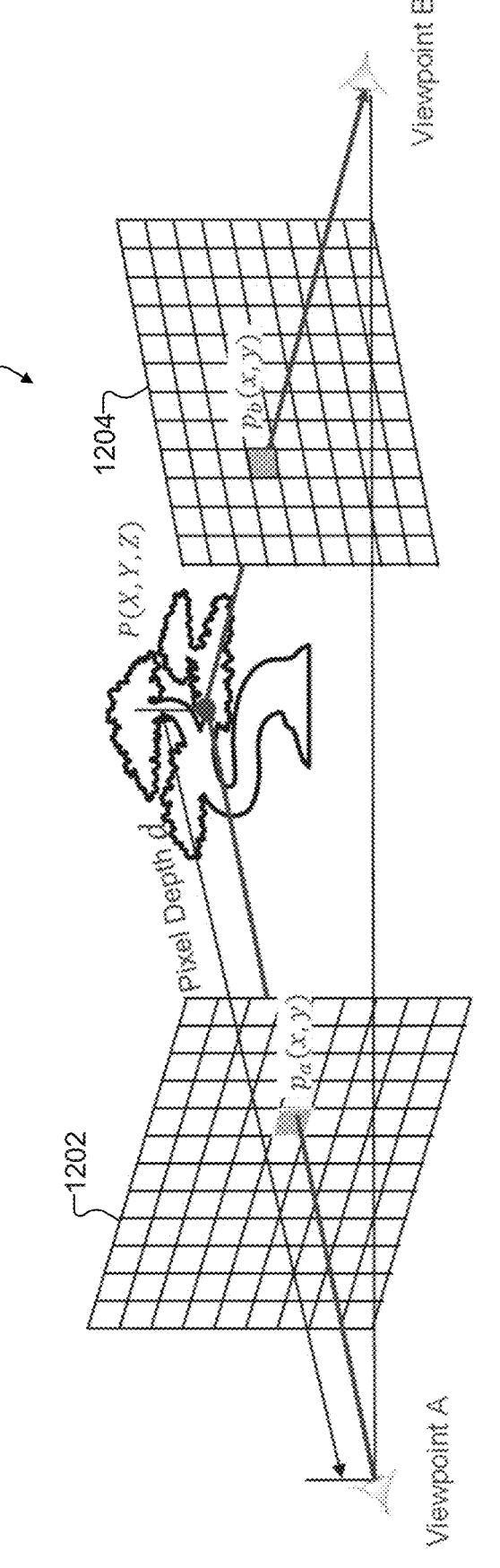
FIG. 12 illustrates an example generation of one virtual image at one viewpoint using another virtual image at another viewpoint in accordance with this disclosure.

FIG. 12 illustrates an example generation 1200 of one virtual image at one viewpoint using another virtual image at another viewpoint in accordance with this disclosure. As shown in FIG. 12, the techniques described above may be used to generate a virtual image 1202 at one location, which is referred to as "Viewpoint A" here. Assume the user moves and is subsequently at another location, which is referred to as "Viewpoint B" here. In some embodiments, the user's XR device may use the same techniques described above to generate another virtual image 1204 at the other location.

In other embodiments, however, the user's XR device may perform a warping operation, such as a 3D warp, to generate the virtual image 1204 using the virtual image 1202. That is, rather than obtaining 3D models at the second viewpoint and performing reprojection to generate the virtual image 1204, the user's XR device may warp the virtual image 1202 in order to generate the virtual image 1204. In some cases, the 3D warp or other warping operation may still involve the generation of a dense depth map, which can be used to support the warping operation. However, the generation of the virtual image 1204 may not involve depth-based or constant-depth reprojection of any 3D models.

Although FIG. 12 illustrates one example of generation 1200 of one virtual image at one viewpoint using another virtual image at another viewpoint, various changes may be made to FIG. 12. For example, the specific examples of the scene and the object within the scene shown in FIG. 12 are for illustration and explanation only. Also, the distance between the two viewpoints here has been exaggerated for ease of illustration, and the warping may be done for any suitable changes in viewpoint location of the XR device.

Figure 13:
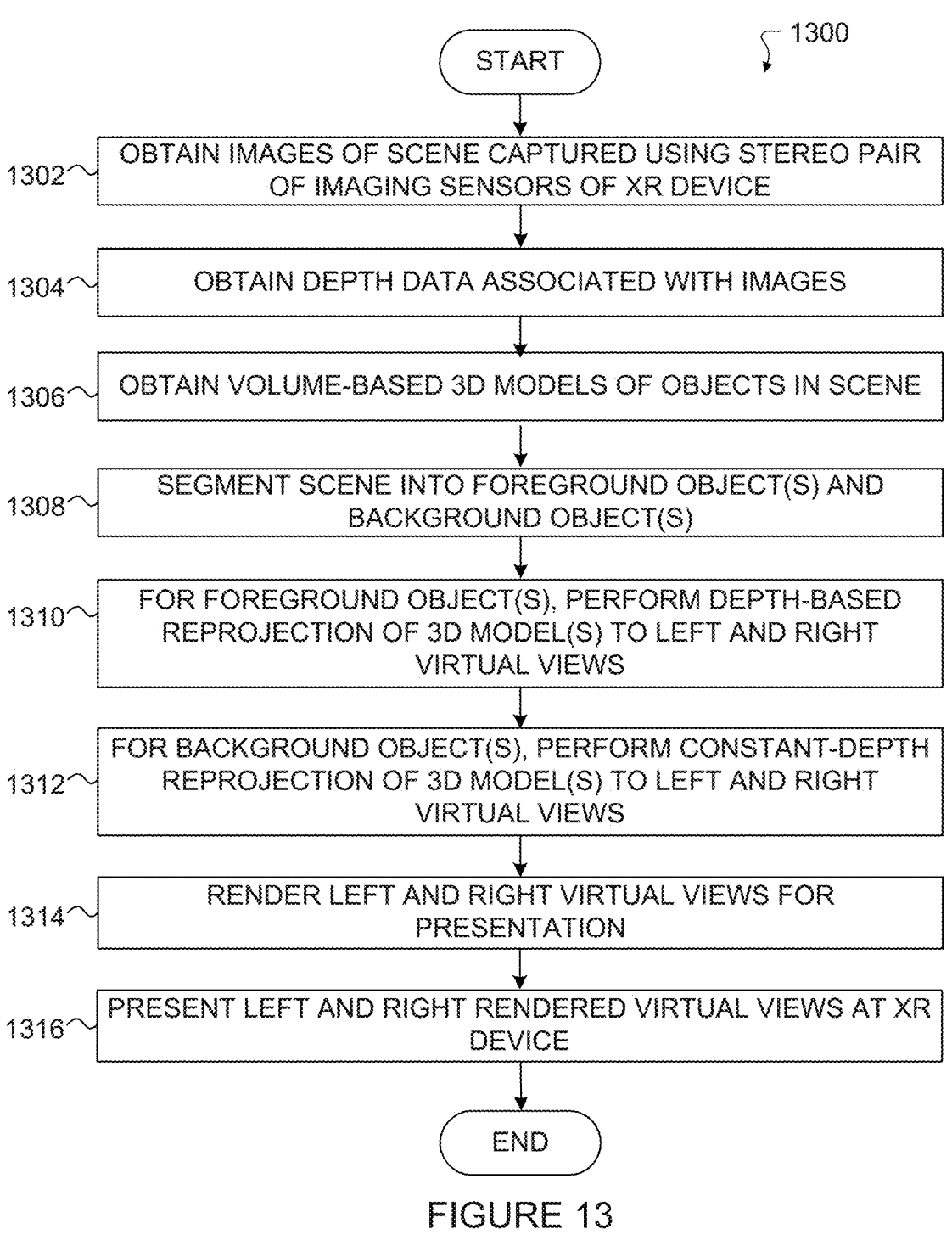
FIG. 13 illustrates an example method for depth-varying reprojection passthrough in VST XR in accordance with this disclosure.

FIG. 13 illustrates an example method 1300 for depth-varying reprojection passthrough in VST XR in accordance with this disclosure. For ease of explanation, the method 1300 shown in FIG. 13 is described as being performed by the electronic device 101 in the network configuration 100 of FIG. 1, where the electronic device 101 can perform the process 200 shown in FIG. 2 using the pipeline 300 shown in FIG. 3 or the pipeline 400 shown in FIG. 4. However, the method 1300 shown in FIG. 13 could be performed using any other suitable device(s) and pipeline(s) and in any other suitable system(s).

As shown in FIG. 13, images of a scene are obtained using a stereo pair of imaging sensors of an XR device at step 1302, and depth data associated with the images is obtained at step 1304. This may include, for example, the processor 120 of the electronic device 101 using the cameras 402 or other imaging sensors 180 to capture see-through images 502 of a scene, where the scene includes multiple objects that are captured in the see-through images 502. This may also include the processor 120 of the electronic device 101 using the depth sensor 404 to obtain depth maps or other depth data, although the depth data may be obtained in any other suitable manner. In some cases, the depth maps or other depth data can be pre-processed, such as by performing super-resolution and depth densification. Note that any other input data may be received here, such as camera pose, IMU, head pose, or eye tracking data.

Volume-based 3D models of objects in the scene are obtained at step 1306. This may include, for example, the processor 120 of the electronic device 101 searching the library 310 to determine if any objects in the scene are associated with predefined or other 3D models already stored in the library 310. If so, the processor 120 of the electronic device 101 can retrieve the 3D model or models from the library. If not, the processor 120 of the electronic device 101 can perform object reconstruction in order to generate one or more 3D models for one or more of the objects in the scene. In some cases, the processor 120 of the electronic device 101 can perform object reconstruction by performing volume reconstruction based on a dense depth map and generating a new 3D model representing the object based on the volume reconstruction and at least one color texture captured in the see-through images 502. Also, in some cases, this may include the processor 120 of the electronic device 101 obtaining a 3D model of the scene itself.

The scene is segmented into one or more foreground objects and one or more background objects at step 1308. Note that any other suitable segmentation technique may be used here. For example, in some cases, this may include the processor 120 of the electronic device 101 identifying a focus region of the user of the electronic device 101 and identifying any object or objects within the focus region, where the identified object(s) can be treated as one or more foreground objects (and all other objects may be treated as background objects). In other cases, this may include the processor 120 of the electronic device 101 identifying a threshold distance using a trained machine learning model, where any object(s) within the threshold distance can be treated as one or more foreground objects (and all other objects may be treated as background objects).

For the foreground object(s), depth-based reprojection of the 3D model(s) of the foreground object(s) to left and right virtual views is performed at step 1310. This may include, for example, the processor 120 of the electronic device 101 performing depth-based reprojection of the 3D model for each foreground object, which is based on the depth(s) of each foreground object within the scene. For the background object(s), constant-depth reprojection of the 3D model(s) of the background object(s) to the left and right virtual views is performed at step 1312. This may include, for example, the processor 120 of the electronic device 101 performing constant-depth reprojection of the 3D model for each background object to a specified depth.

The left and right virtual views are rendered for presentation at step 1314, and the left and right rendered virtual views are presented at the XR device at step 1316. This may include, for example, the processor 120 of the electronic device 101 generating left and right virtual view images based on the reprojections. This may also include the processor 120 of the electronic device 101 performing any desired operations to correct for geometric distortions and chromatic aberrations. This may further include the processor 120 of the electronic device 101 initiating display of the left and right rendered virtual views on one or more displays 160 of the electronic device 101.

Although FIG. 13 illustrates one example of a method 1300 for depth-varying reprojection passthrough in VST XR, various changes may be made to FIG. 13. For example, while shown as a series of steps, various steps in FIG. 13 may overlap, occur in parallel, occur in a different order, or occur any number of times (including zero times).

It should be noted that the functions shown in or described with respect to FIGS. 2 through 13 can be implemented in an electronic device 101, 102, 104, server 106, or other device(s) in any suitable manner. For example, in some embodiments, at least some of the functions shown in or described with respect to FIGS. 2 through 13 can be implemented or supported using one or more software applications or other software instructions that are executed by the processor 120 of the electronic device 101, 102, 104, server 106, or other device(s). In other embodiments, at least some of the functions shown in or described with respect to FIGS. 2 through 13 can be implemented or supported using dedicated hardware components. In general, the functions shown in or described with respect to FIGS. 2 through 13 can be performed using any suitable hardware or any suitable combination of hardware and software/firmware instructions. Also, the functions shown in or described with respect to FIGS. 2 through 13 can be performed by a single device or by multiple devices.

Although this disclosure has been described with example embodiments, various changes and modifications may be suggested to one skilled in the art. It is intended that this disclosure encompass such changes and modifications as fall within the scope of the appended claims.

What is claimed is:

1. A method comprising:
obtaining (i) images of a scene captured using a stereo pair of imaging sensors of an extended reality (XR) device and (ii) depth data associated with the images, the scene including one or more first objects and one or more second objects;
obtaining volume-based three-dimensional (3D) models of the first and second objects included in the scene, the volume-based 3D models including: (i) one or more 3D models of the one or more first objects and (ii) one or more 3D models of the one or more second objects;
for the one or more first objects, performing depth-based reprojection of the one or more 3D models of the one or more first objects to a left virtual view and a right virtual view based on one or more depths of the one or more first objects;
for the one or more second objects, performing constant-depth reprojection of the one or more 3D models of the one or more second objects to the left virtual view and the right virtual view based on a specified depth; and
rendering the left virtual view and the right virtual view for presentation by the XR device.

2. The method of claim 1, wherein obtaining the volume-based 3D models of the first and second objects in the scene comprises, for each of the first and second objects:
determining whether a corresponding volume-based 3D model for the object exists in a library of previously-generated volume-based 3D models; and
one of:
responsive to determining that the corresponding volume-based 3D model for the object does exist in the library, obtaining the corresponding volume-based 3D model from the library; or
responsive to determining that the corresponding volume-based 3D model for the object does not exist in the library, generating a new volume-based 3D model representing the object.

3. The method of claim 2, wherein generating the new volume-based 3D model representing the object comprises:
generating a dense depth map based on the images of the scene, the depth data, and position data associated with the XR device;
performing volume reconstruction based on the dense depth map; and
generating the new volume-based 3D model representing the object based on the volume reconstruction and at least one color texture captured in the images.

4. The method of claim 2, wherein:
the library of previously-generated volume-based 3D models is configured to store 3D models of scenes, real-world objects, and virtual objects; and
each of the 3D models in the library comprises a 3D mesh representing a geometry of an associated scene or object, a color texture map representing at least one color of the associated scene or object, and one or more parameters identifying at least one of a pattern, dimensions, a pose, or a transformation of the associated scene or object.

5. The method of claim 1, wherein:
the one or more first objects are positioned within a threshold distance from the XR device;
the one or more second objects are positioned beyond the threshold distance from the XR device; and
the method further comprises identifying the threshold distance using a trained machine learning model.

6. The method of claim 1, wherein:
the method further comprises identifying a focus region of a user;
the one or more first objects are positioned within the focus region of the user; and the one or more second objects are positioned outside the focus region of the user.

7. The method of claim 1, wherein:
the one or more first objects comprise one or more foreground objects in the scene; and
the one or more second objects comprise one or more background objects in the scene.

8. An extended reality (XR) device comprising:
at least one display;
imaging sensors configured to capture images of a scene, the scene including one or more first objects and one or more second objects; and
at least one processing device configured to:
obtain (i) the images of the scene and (ii) depth data associated with the images;
obtain volume-based three-dimensional (3D) models of the first and second objects included in the scene, the volume-based 3D models including: (i) one or more 3D models of the one or more first objects and (ii) one or more 3D models of the one or more second objects;
for the one or more first objects, perform depth-based reprojection of the one or more 3D models of the one or more first objects to a left virtual view and a right virtual view based on one or more depths of the one or more first objects;
for the one or more second objects, perform constant-depth reprojection of the one or more 3D models of the one or more second objects to the left virtual view and the right virtual view based on a specified depth; and
render the left virtual view and the right virtual view for presentation by the at least one display.

9. The XR device of claim 8, wherein, to obtain the volume-based 3D models of the first and second objects in the scene, the at least one processing device is configured, for each of the first and second objects, to:
determine whether a corresponding volume-based 3D model for the object exists in a library of previously-generated volume-based 3D models; and
one of:
responsive to determining that the corresponding volume-based 3D model for the object does exist in the library, obtain the corresponding volume-based 3D model from the library; or
responsive to determining that the corresponding volume-based 3D model for the object does not exist in the library, generate a new volume-based 3D model representing the object.

10. The XR device of claim 9, wherein, to generate the new volume-based 3D model representing the object, the at least one processing device is configured to:
generate a dense depth map based on the images of the scene, the depth data, and position data associated with the XR device;
perform volume reconstruction based on the dense depth map; and
generate the new volume-based 3D model representing the object based on the volume reconstruction and at least one color texture captured in the images.

11. The XR device of claim 9, wherein:
the library of previously-generated volume-based 3D models is configured to store 3D models of scenes, real-world objects, and virtual objects; and
each of the 3D models in the library comprises a 3D mesh representing a geometry of an associated scene or object, a color texture map representing at least one color of the associated scene or object, and one or more parameters identifying at least one of a pattern, dimensions, a pose, or a transformation of the associated scene or object.

12. The XR device of claim 8, wherein:
the one or more first objects are positioned within a threshold distance from the XR device;
the one or more second objects are positioned beyond the threshold distance from the XR device; and
the at least one processing device is further configured to identify the threshold distance using a trained machine learning model.

13. The XR device of claim 8, wherein:
the at least one processing device is further configured to identify a focus region of a user;
the one or more first objects are positioned within the focus region of the user; and
the one or more second objects are positioned outside the focus region of the user.

14. The XR device of claim 8, wherein:
the one or more first objects comprise one or more foreground objects in the scene; and
the one or more second objects comprise one or more background objects in the scene.

15. A non-transitory machine readable medium containing instructions that when executed cause at least one processor to:
obtain (i) images of a scene captured using a stereo pair of imaging sensors of an extended reality (XR) device and (ii) depth data associated with the images, the scene including one or more first objects and one or more second objects;
obtain volume-based three-dimensional (3D) models of the first and second objects included in the scene, the volume-based 3D models including: (i) one or more 3D models of the one or more first objects and (ii) one or more 3D models of the one or more second objects;
for the one or more first objects, perform depth-based reprojection of the one or more 3D models of the one or more first objects to a left virtual view and a right virtual view based on one or more depths of the one or more first objects;
for the one or more second objects, perform constant-depth reprojection of the one or more 3D models of the one or more second objects to the left virtual view and the right virtual view based on a specified depth; and
render the left virtual view and the right virtual view for presentation by the XR device.

16. The non-transitory machine readable medium of claim 15, wherein the instructions that when executed cause the at least one processor to obtain the volume-based 3D models of the first and second objects in the scene comprise:
instructions that when executed cause the at least one processor, for each of the first and second objects, to:
determine whether a corresponding volume-based 3D model for the object exists in a library of previously-generated volume-based 3D models; and
one of:
responsive to determining that the corresponding volume-based 3D model for the object does exist in the library, obtain the corresponding volume-based 3D model from the library; or
responsive to determining that the corresponding volume-based 3D model for the object does not exist in the library, generate a new volume-based 3D model representing the object.

17. The non-transitory machine readable medium of claim 16, wherein the instructions that when executed cause the at least one processor to generate the new volume-based 3D model representing the object comprise:

instructions that when executed cause the at least one processor to:

generate a dense depth map based on the images of the scene, the depth data, and position data associated with the XR device;

perform volume reconstruction based on the dense depth map; and generate the new volume-based 3D model representing the object based on the volume reconstruction and at least one color texture captured in the images.

18. The non-transitory machine readable medium of claim 16, wherein:

the library of previously-generated volume-based 3D models is configured to store 3D models of scenes, real-world objects, and virtual objects; and each of the 3D models in the library comprises a 3D mesh representing a geometry of an associated scene or object, a color texture map representing at least one color of the associated scene or object, and one or more parameters identifying at least one of a pattern, dimensions, a pose, or a transformation of the associated scene or object.

19. The non-transitory machine readable medium of claim 15, wherein:

the one or more first objects are positioned within a threshold distance from the XR device;

the one or more second objects are positioned beyond the threshold distance from the XR device; and the instructions when executed further cause the at least one processor to identify the threshold distance using a trained machine learning model.

20. The non-transitory machine readable medium of claim 15, wherein:

the instructions when executed further cause the at least one processor to identify a focus region of a user;

the one or more first objects are positioned within the focus region of the user; and the one or more second objects are positioned outside the focus region of the user.

* * * * *